United States Patent
Choi et al.

(10) Patent No.: US 10,356,757 B2
(45) Date of Patent: Jul. 16, 2019

(54) METHOD FOR TRANSMITTING/RECEIVING SIGNAL IN WIRELESS LAN SYSTEM AND DEVICE THEREFOR

(71) Applicant: LG ELECTRONICS INC., Seoul (KR)

(72) Inventors: Hyeyoung Choi, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/562,400

(22) PCT Filed: Dec. 4, 2015

(86) PCT No.: PCT/KR2015/013235
§ 371 (c)(1),
(2) Date: Sep. 27, 2017

(87) PCT Pub. No.: WO2016/167438
PCT Pub. Date: Oct. 20, 2016

(65) Prior Publication Data
US 2018/0288743 A1 Oct. 4, 2018

Related U.S. Application Data

(60) Provisional application No. 62/187,230, filed on Jun. 30, 2015, provisional application No. 62/182,648, (Continued)

(51) Int. Cl.
*H04W 72/04* (2009.01)
*H04W 84/12* (2009.01)
(Continued)

(52) U.S. Cl.
CPC ............ *H04W 72/04* (2013.01); *H04L 1/16* (2013.01); *H04L 5/0094* (2013.01);
(Continued)

(58) Field of Classification Search
CPC ....... H04W 74/00–0858; H04W 76/10; H04W 76/11; H04W 76/18
See application file for complete search history.

(56) References Cited

U.S. PATENT DOCUMENTS

2012/0230242 A1  9/2012  Kim et al.
2018/0041917 A1*  2/2018  Xi ...................... H04W 72/121

FOREIGN PATENT DOCUMENTS

WO  2011065746  6/2011
WO  2011102575  8/2011
(Continued)

OTHER PUBLICATIONS

PCT International Application No. PCT/KR2015/013235, Written Opinion of the International Searching Authority dated Mar. 14, 2016, 20 pages.

*Primary Examiner* — Pao Sinkantarakorn
(74) *Attorney, Agent, or Firm* — Lee Hong Degerman Kang Waimey

(57) ABSTRACT

A method for a station (STA) not having an association identifier (AID) allocated thereto transmitting a signal in a wireless LAN system, according to one embodiment of the present invention, comprises the steps of: transmitting a first frame through at least one resource among resources indicated by a trigger frame; and receiving a multi-STA block Ack (M-BA) frame as a reply to the first frame, wherein, if in the M-BA frame a MAC address of the STA that is different from a first information is detected from at least a (Continued)

part of a first field reserved for the first information, an N-bit of a second field preceding the first field is set as a temporary AID of the STA.

20 Claims, 35 Drawing Sheets

Related U.S. Application Data filed on Jun. 22, 2015, provisional application No. 62/171,241, filed on Jun. 5, 2015, provisional application No. 62/147,606, filed on Apr. 15, 2015.

(51) Int. Cl.
*H04W 76/10* (2018.01)
*H04W 74/08* (2009.01)
*H04L 1/16* (2006.01)
*H04L 5/00* (2006.01)
*H04W 74/00* (2009.01)
*H04W 74/06* (2009.01)

(52) U.S. Cl.
CPC ....... *H04W 74/0833* (2013.01); *H04W 76/10* (2018.02); *H04W 84/12* (2013.01); *H04W 74/006* (2013.01); *H04W 74/06* (2013.01)

(56) References Cited

FOREIGN PATENT DOCUMENTS

WO     2014003473     1/2014
WO     2014042596     3/2014

\* cited by examiner

| | B0 B1 | B2 | B3 | B4 B9 | B10 B12 | B13 B15 | B16 B18 | B19 B21 | B22 | B23 |
|---|---|---|---|---|---|---|---|---|---|---|
| Composite Name: | BW | Reserved | STBC | Group ID | NSTS/Partial AID | | | | TXOP_PS_NOT_ALLOWED | Reserved |
| SU Name: | | | | | SU NSTS | Partial AID | | | | |
| MU Name: | | | | | MU[0] NSTS | MU[1] NSTS | MU[2] NSTS | MU[3] NSTS | | |
| Bits: | 2 | 1 | 1 | 6 | 3 | 3 | 3 | 3 | 1 | 1 |

(b)

| | B0 | B1 | B2 | B3 | B4 | B5 | B6 | B7 | B8 | B9 | B10 B17 | B18 B23 |
|---|---|---|---|---|---|---|---|---|---|---|---|---|
| Composite Name: | Short GI | Short GI NSYM Disambiguation | SU/MU[0] Coding | LDPC Extra OFDM symbol | SU VHT-MCS/MU[1-3] Coding | | | | Beam-formed | Reserved | CRC | Tail |
| SU Name: | | | | | SU VHT-MCS | | | | Beam-formed | | | |
| MU Name: | | | | | MU[1] Coding | MU[2] Coding | MU[3] Coding | Reserved | Reserved | | | |
| Bits: | 1 | 1 | 1 | 1 | 1 | 1 | 1 | 1 | 1 | 1 | 8 | 6 |

FIG. 19

| Octets: 2 | 2 | 6 | 6 | 6 | 2 | 6 | 2 | 4 | 0-11426 | 4 |
|---|---|---|---|---|---|---|---|---|---|---|
| Frame Control | Duration /ID | Address 1 | Address 2 | Address 3 | Sequence Control | Address 4 | QoS Control | HT Control | Frame Body | FCS |

MAC header

FIG. 20

| | B1 B15 | B16 B17 | B18 B19 | B20 B21 | B22 B23 | B24 | B25 B29 | B30 | B31 |
|---|---|---|---|---|---|---|---|---|---|
| VHT =0 | Link Adaptation Control | Calibration Position | Calibration Sequence | Reserved | CSI/St eering | NDP Announ cement | Reserved | AC Constraint | RDG/ More PPDU |
| Bits: 1 | 15 | 2 | 2 | 2 | 2 | 1 | 5 | 1 | 1 |

(a)

| B1 | B2 B5 | B6 B8 | B9 B15 |
|---|---|---|---|
| TRQ | MAI | MFSI | MFB/ASELC |
| 1 | 4 | 3 | 7 |

| B1 | B2 | B3 B5 | B6 B8 | B9 B23 | B24 B26 | B27 | B28 | B29 | B30 | B31 |
|---|---|---|---|---|---|---|---|---|---|---|
| VHT=1 | Reserved | MRQ | MSI | MFSI/ GID-L | MFB | GID-H | Coding Type | FB Tx Type | Unsoli cited MFB | AC Constraint | RDG/ More PPD U |
| Bits: 1 | 1 | 1 | 3 | 3 | 15 | 3 | 1 | 1 | 1 | 1 | 1 |

(a)

| B9 B11 | B12 B15 | B16 B17 | B16 B23 |
|---|---|---|---|
| VHT N_STS | MCS | BW | SNR |
| 3 | 4 | 2 | 6 |

| Frame Control | A1 | A2 | Sequence Control | A3 | A4 | Frame Body | FCS |
|---|---|---|---|---|---|---|---|
| Octets: 2 | 2 or 6 | 6 or 2 | 0 or 2 | 0 or 6 | 0 or 6 | variable | 4 |

(a)

| B0 B1 | B2 B4 | B5 B7 | B8 | B9 | B10 | B11 | B12 | B13 | B14 | B15 |
|---|---|---|---|---|---|---|---|---|---|---|
| Protocol Version | Type | PTID/ Subtype | From DS | More Fragments | Power Management | More Data | Protected Frame | End of Service Period | Relayed Frame | Ack Policy |
| Bits: 2 | 3 | 3 | 1 | 1 | 1 | 1 | 1 | 1 | 1 | 1 |

| L-STF | L-LTF | L-SIG | HE-SIGA | HE-STF | HE-LTF | HE-SIGB | Data |
|---|---|---|---|---|---|---|---|

(a)

| L-STF | L-LTF | L-SIG | HE-SIGA |         | HE-STF | HE-LTF | Data |
|---|---|---|---|---|---|---|---|
| L-STF | L-LTF | L-SIG | HE-SIGA | HE-SIGB | HE-STF | HE-LTF | Data |
| L-STF | L-LTF | L-SIG | HE-SIGA |         | HE-STF | HE-LTF | Data |
| L-STF | L-LTF | L-SIG | HE-SIGA |         | HE-STF | HE-LTF | Data |

Duplicated  Encoding over full BW (b)

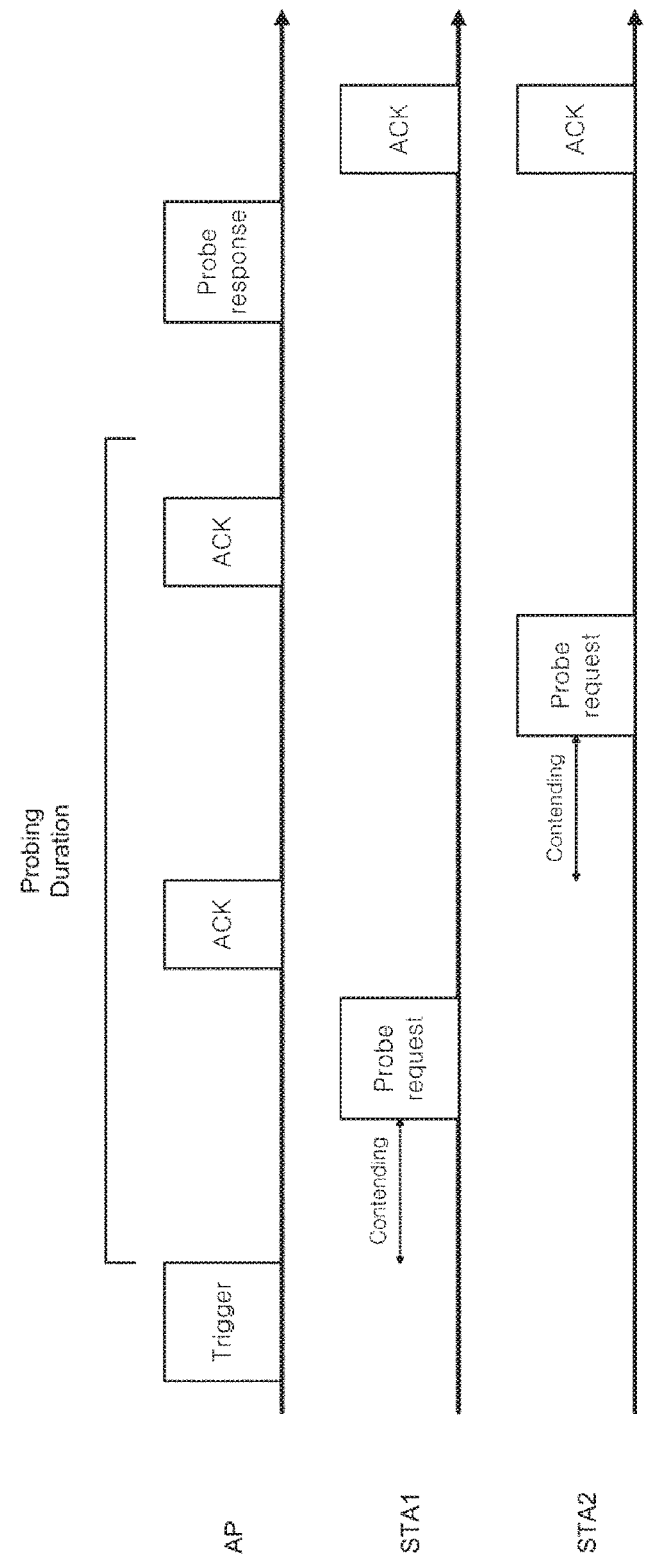

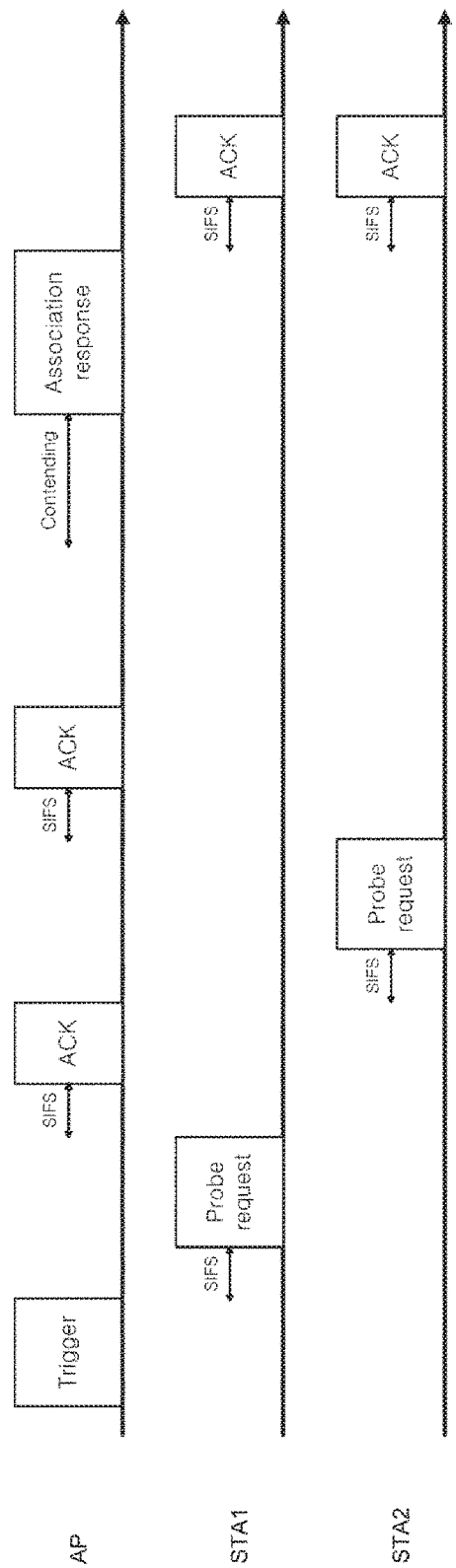

FIG. 40

| Element ID | Length | CWmin for Frame type 1 | RU size for Frame type 1 | CWmin for Frame type 2 | CWmin for Frame type 2 | RU size for Frame type 2 |
|---|---|---|---|---|---|---|

METHOD FOR TRANSMITTING/RECEIVING SIGNAL IN WIRELESS LAN SYSTEM AND DEVICE THEREFOR

CROSS-REFERENCE TO RELATED APPLICATIONS

This application is the National Stage filing under 35 U.S.C. 371 of International Application No. PCT/KR2015/013235, filed on Dec. 4, 2015, which claims the benefit of U.S. Provisional Application No. 62/147,606, filed on Apr. 15, 2015, 62/171,241, filed on Jun. 5, 2015, 62/182,648, filed on Jun. 22, 2015, and 62/187,230, filed on Jun. 30, 2015, the contents of which are all hereby incorporated by reference herein in their entirety.

TECHNICAL FIELD

The present invention relates to a wireless LAN system, and more particularly, to a method of transmitting or receiving a signal in a wireless LAN system and a station therefor.

BACKGROUND ART

A method of transmitting a signal proposed in the following can be applied to various wireless communications. As an example of a system to which the present invention is applicable, a wireless local area network (WLAN) is explained in the following.

Wireless Local Area Network (WLAN) technology standards are established by the IEEE 802.11 standards committee. IEEE 802.11a and 11b respectively provide maximum data rates of 11 Mbps and 54 Mbps using unlicensed bands of 2.4. GHz and 5 GHz. IEEE 802.11g adopts OFDM (Orthogonal Frequency Divisional Multiplexing) and provides maximum data rates of 54 Mbps. IEEE 802.11n adopts MIMO-OFDM and provides maximum data rates of 300 Mbps for 4 spatial streams. IEEE 802.11n supports up to 40 MHz channel bandwidth and provides maximum data rates of 600 Mbps.

The aforementioned WLAN standards have experienced IEEE 802.11ac standard supporting maximum 1 Gbit/s speed by using a bandwidth of maximum 160 MHz and supporting 8 spatial streams. Discussion on IEEE 802.11ax standard is in progress.

DISCLOSURE OF THE INVENTION

Technical Task

A technical task of the present invention is to provide a method for stations to efficiently transmit or receive a signal according to an MU-OFDMA-based random access scheme.

A technical task of the present invention is not limited by the above-mentioned technical task. The technical task of the present invention can be induced from embodiments in which other technical tasks are disclosed.

Technical Solution

To achieve these and other advantages and in accordance with the purpose of the present invention, as embodied and broadly described, according to one embodiment, a method for a station (STA) to which AID is not assigned to transmit a signal in a wireless LAN system includes transmitting a first frame via at least one of resources indicated by a trigger frame and receiving an M-BA (Multi-STA Block Ack) frame in response to the first frame. In this case, if MAC address of the STA different from first information is detected from at least part of a first field reserved for the first information in the M-BA frame, N-bit of a second field preceding the first field is configured as a temporary AID (association identifier) of the STA.

To further achieve these and other advantages and in accordance with the purpose of the present invention, according to a different embodiment, a station (STA) transmitting a signal in a wireless LAN system includes a transmitter configured to transmit a first frame via at least one or more resources among resources indicated by a trigger frame and a receiver configured to receive an M-BA (multi-STA block ack) frame in response to the first frame. In this case, if MAC address of the STA different from first information is detected from at least a part of a first field reserved for the first information in the M-BA frame, N-bit of a second field preceding the first field is configured as a temporary AID (association identifier) of the STA.

Preferably, the first field can include at least one of a block ack starting sequence control field and a block ack bitmap field in the M-BA frame.

Preferably, the first frame can be transmitted on a bandwidth narrower than 20 MHz according to an MU-OFDMA (multi user-orthogonal frequency division multiple access)-based random access scheme.

Preferably, detection of the MAC address can be performed when at least one of a condition in which a LSB (least significant bit) of reserved bits of a per traffic identifier information field is activated and a condition in which a TID value is configured as a first value.

Preferably, the STA to which the AID is not assigned can be identified by the temporary AID in an association procedure which is performed by an MU-OFDMA (multi user-orthogonal frequency division multiple access)-based random access scheme.

Preferably, the STA can receive the trigger frame including allocation information of the resources and temporary AIDs mapped to each of the resources. In this case, the temporary AID of the STA can be mapped to the at least one resource in which the first frame is transmitted among the resources.

Preferably, if a TID value is configured as a second value in a per traffic identifier information field of the M-BA frame, the STA can retransmit the first frame at a timing indicated by the second value.

Preferably, if N-bit of the first field is configured by a value corresponding to the at least one resource in which the first frame is transmitted and the MAC address of the STA is not detected from the first field, the STA can retransmit the first frame.

Preferably, the first frame may correspond to an association request frame or a probe request frame and the N-bit of the second field may correspond to one or more bits among 'B0' to B10' bits of a per traffic identifier information field or bits of a block ack starting sequence control field.

To further achieve these and other advantages and in accordance with the purpose of the present invention, according to a further different embodiment, a method of receiving a signal, which is received by a first station (STA) from a second station to which an AID is not assigned in a wireless LAN system, includes receiving a first frame via at least one of resources indicated by a trigger frame and transmitting an M-BA (multi-STA block ack) frame by setting MAC address of the second station different from first information to at least part of a first field reserved for the first information and configuring N-bit of a second field preceding the first field as a temporary AID of the second station in the M-BA frame.

Advantageous Effects

According to one embodiment of the present invention, stations are able to efficiently transmit or receive a signal according to an MU-OFDMA-based random access scheme since a collision problem is solved via a MAC address of a station by assigning a temporary AID to a station to which an AID is not assigned.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIGS. 14 to 18 are diagrams for explaining an example of a frame structure used in IEEE 802.11 system;

FIGS. 19 to 21 are diagrams for an MAC frame format;

FIG. 22 is a diagram for a short MAC frame format;

FIG. 23 is a diagram for an example of a PPDU format;

FIGS. 27A, 27B, 27C, and 27D are diagrams for active scanning procedures according to embodiments of the present invention;

FIG. 40 is a diagram for a format of multi-user random access information according to one embodiment of the preset invention;

BEST MODE

Mode for Invention

Figure 1:
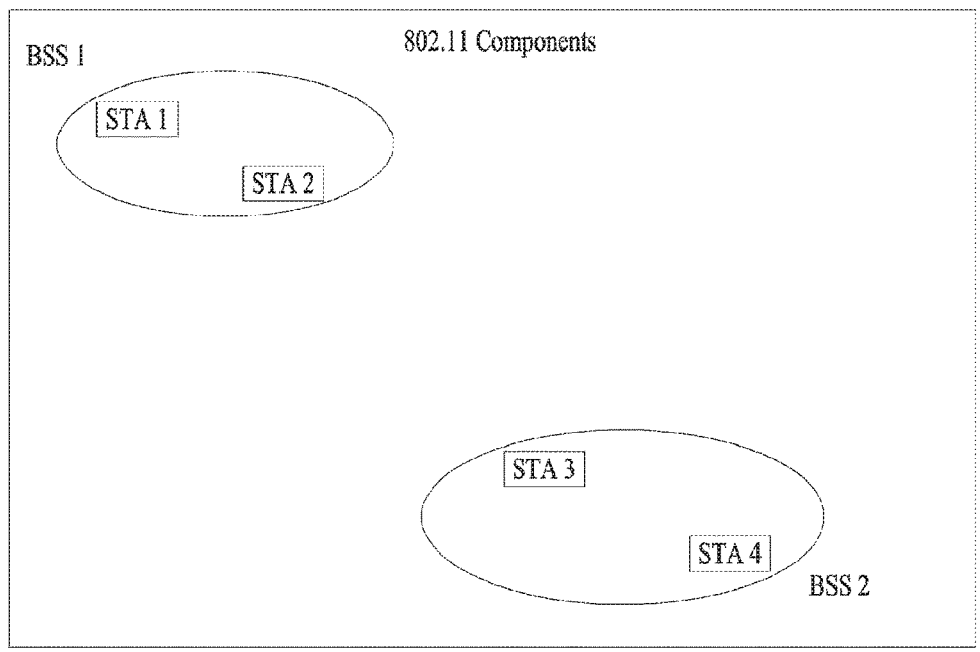
FIG. 1 is a diagram for an example of a configuration of a WLAN system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

In the present specification, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For example, a first configuration element can be referred to as a second configuration element, similarly, the second configuration element can be referred to as the first configuration element while not being deviated from the scope of right according to the concept of the present specification.

In the present application, such a terminology as 'comprise', 'include' and the like should be construed not as excluding existence of a different configuration element but as designating further existence of a different configuration element. In this disclosure, such a terminology as ' . . . unit', ' . . . part' corresponds to a unit for processing at least one or more functions or operations. The unit can be implemented by a combination of hardware and/or software.

FIG. 1 is a diagram of one example of a configuration of a wireless local area network system.

As depicted in FIG. 1, a wireless local area network includes at least one Basic Service Set (BSS). The BSS is a set of stations (STA) capable of communicating with each other by successfully performing synchronization.

The STA is a logical entity including a physical layer interface for a Medium Access Control (MAC) and wireless media. The STA includes an access point (AP) and a Non-AP STA (Non-AP station). A mobile terminal operated by a user corresponds to the Non-AP STA among the STAs. If it is simply called an STA, the STA may correspond to the Non-AP STA. The Non-AP STA can be called such a different name as a terminal, a Wireless Transmit/Receive Unit (WTRU), User Equipment (UE), a Mobile Station (MS), a Mobile Terminal, a Mobile Subscriber Unit, or the like.

And, the AP is an entity providing an STA associated to the AP with an access to a distribution system (DS) via the wireless media. The AP can be called a concentrated controller, a Base Station (BS), a Node-B, a Base Transceiver System (BTS), a site controller, or the like.

The BSS can be divided into an infrastructure BSS and an independent BSS (IBSS).

The BSS depicted in FIG. 1 corresponds to the IBSS. The IBSS means the BSS not including an AP. Since the IBSS does not include the AP, an access to the DS is not permitted to the IBSS. Thus, the IBSS forms a self-contained network.

Figure 2:
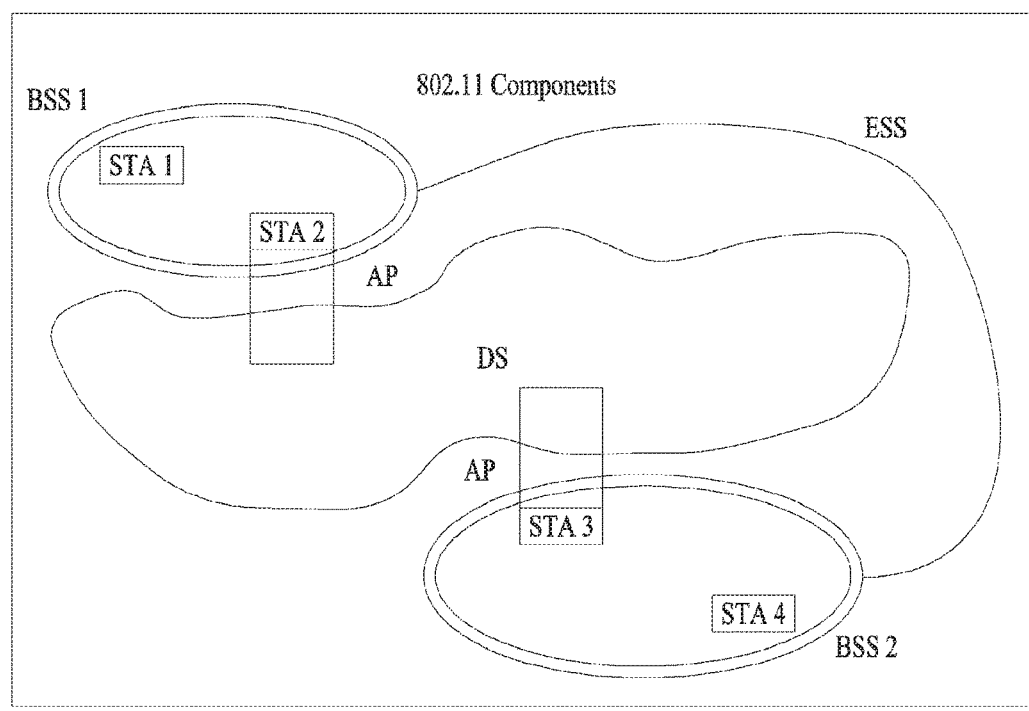
FIG. 2 is a diagram for a different example of a configuration of a WLAN system.

FIG. 2 is a diagram of a different example of a configuration of a wireless local area network system.

The BSS depicted in FIG. 2 corresponds to the infrastructure BSS. The infrastructure BSS includes at least one STA and an AP. Although a principle of a communication between non-AP STAs is to perform the communication via the AP, if a link is directly established between the non-AP STAs, it is possible to directly communicate between the non-AP STAs.

As depicted in FIG. 2, a plurality of infrastructure BSSs can be connected to each other via the DS. A plurality of the infrastructure BSSs connected through the DS is called an Extended Service Set (ESS). STAs included in the ESS can communicate with each other and a non-AP STA can move from one BSS to another BSS while seamlessly communicating in an identical ESS.

The DS is a mechanism connecting a plurality of APs to each other and the DS is not necessarily to be a network. If the DS is able to provide a prescribed distribution service, there is no limit on a form of the DS. For instance, the DS may correspond to such a wireless network as a mesh network or may correspond to a physical structure connecting APs to each other.

Figure 3:
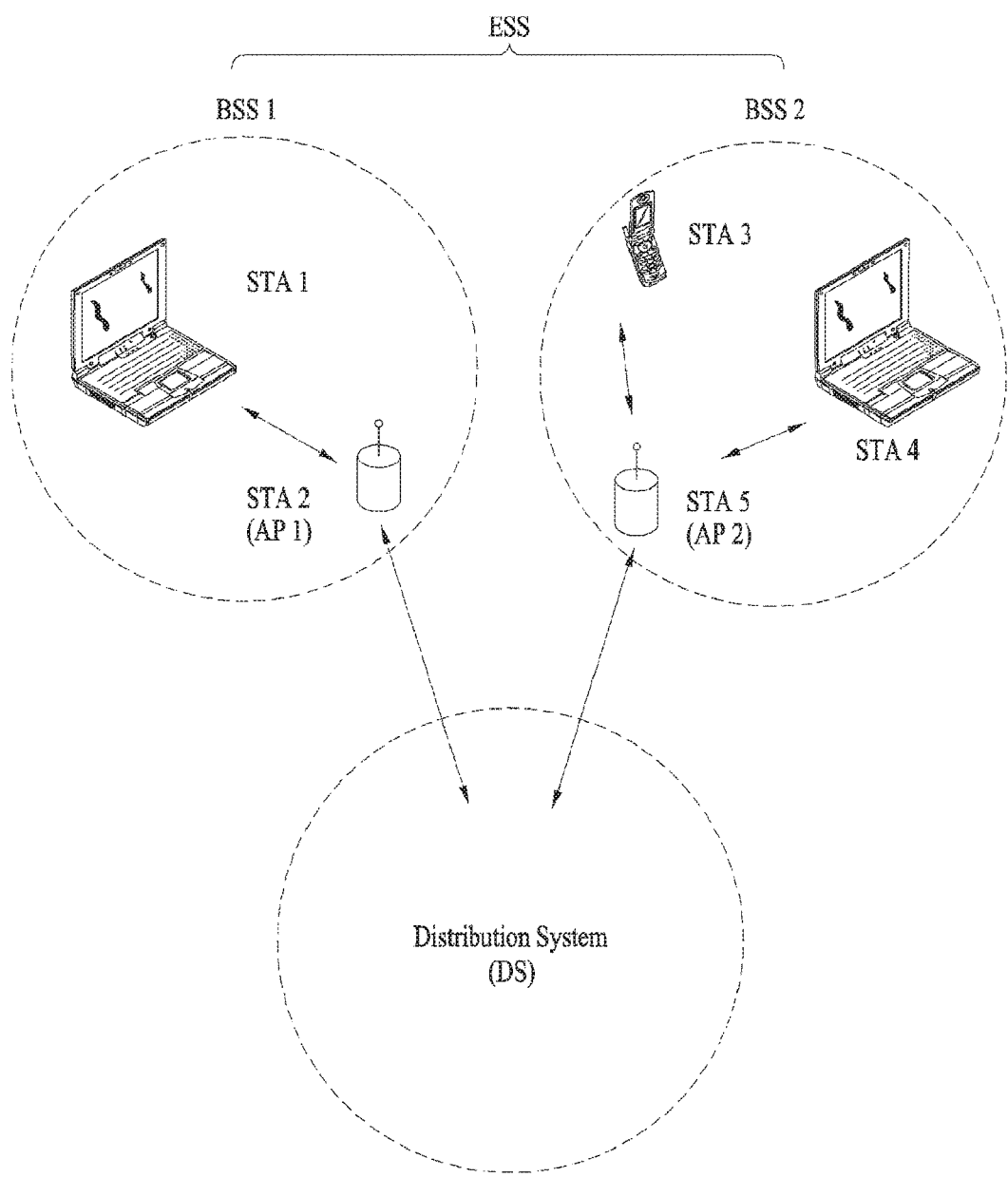
FIG. 3 is a diagram for an exemplary structure of a WLAN system.

FIG. 3 is a diagram for an exemplary structure of a WLAN system. In FIG. 3, an example of an infrastructure BSS including a DS is described.

Referring to an example of FIG. 3, ESS includes a BSS1 and BSS2. In a WLAN system, a station corresponds to a device operating according to MAC/PHY regulation of IEEE 802.11. A station includes an AP station and a non-AP station. In general, the non-AP station corresponds to such a device directly handled by a user as a laptop computer, a mobile phone, and the like. In the example of FIG. 3, a station 1, a station 3, and a station 4 correspond to the non-AP station and a station 2 and a station 5 correspond to the AP station.

In the following description, the non-AP station may be referred to as a terminal, a wireless transmit/receive unit (WTRU), a user equipment (UE), a mobile station (MS), a mobile terminal, a mobile subscriber station (MSS), and the like. And, the AP corresponds to a base station (BS), a Node-B, an evolved Node-B (eNB), a base transceiver system (BTS), a femto BS, and the like.

Figure 4:
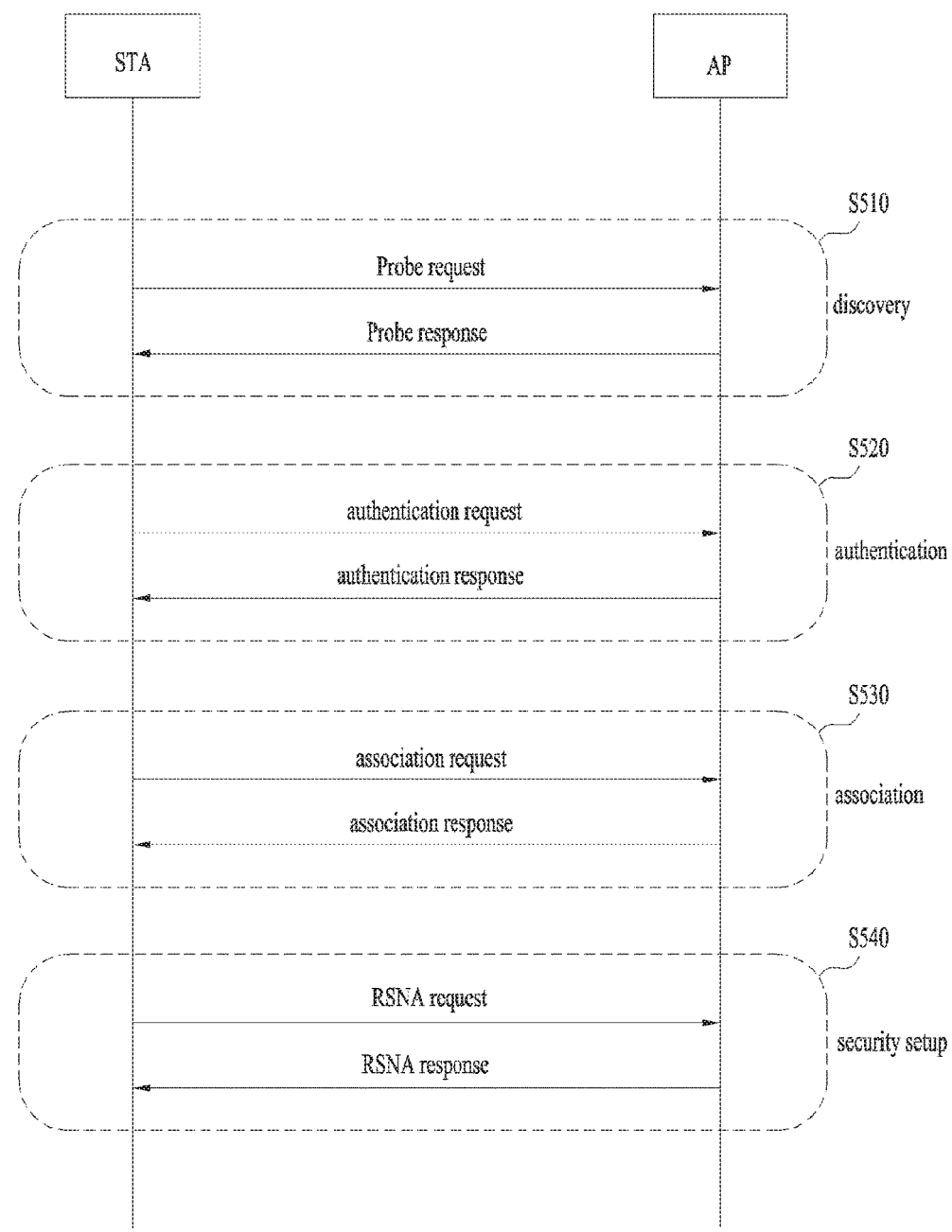
FIG. 4 is a flowchart for explaining a link setup procedure in a WLAN system.
Figure 5:
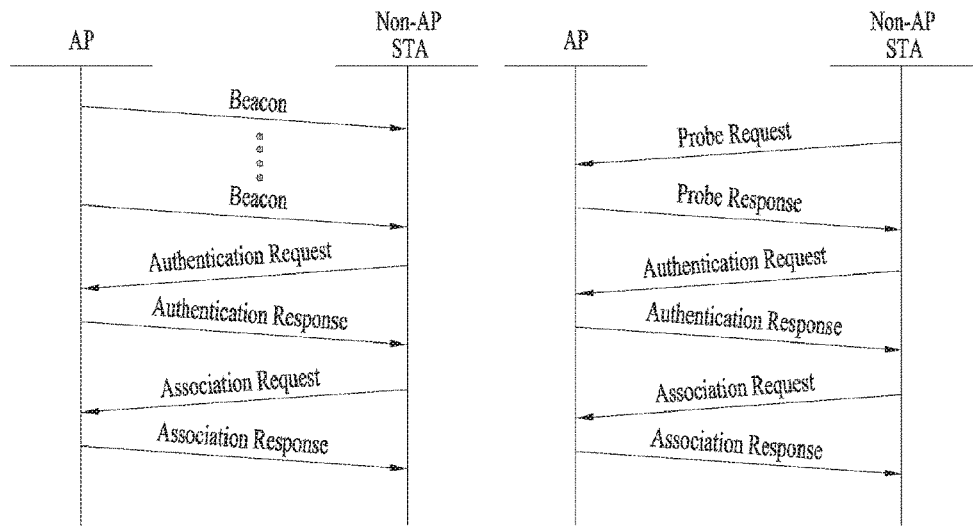
FIG. 5 is a diagram for explaining active scanning and passive scanning methods.

FIG. 4 is a flowchart for explaining a link setup procedure in a WLAN system and FIG. 5 is a diagram for explaining active scanning and passive scanning methods.

In order for a station to set up a link with a network and transceive data with the network, it is necessary for the station to discover the network, perform authentication, establish association, and pass through an authentication procedure for security. The link setup procedure can also be referred to as a session initiation procedure or a session setup procedure. And, discovery, authentication, association, and security setup procedures of the link setup procedure can be commonly called an association procedure.

An example of the link setup procedure is explained in the following with reference to FIG. 4.

In the step S410, a station can perform a network discovery operation. The network discovery operation can include a scanning operation of the station. In particular, in order for the station to access a network, it is necessary for the station to find out a network in which the station is able to participate. The station needs to identify a compatible network before participating in a wireless network. A procedure of identifying a network existing at a specific region is called scanning.

A scanning scheme includes active scanning and passive scanning. In FIG. 4, although a network discovery operation including an active scanning procedure is explained for example, a station may operate with a passive scanning procedure.

According to the active scanning, a scanning performing station transmits a probe request frame to a responder to discover a AP existing in the vicinity of the station and waits for a response. The responder transmits a probe response frame to the station, which has transmitted the probe request frame, in response to the probe request frame. In this case, the responder may correspond to a station, which has lastly transmitted a beacon frame in a BSS on a channel being scanned. In the BSS, since an AP transmits a beacon frame, the AP becomes the responder. In an IBSS, since stations in the IBSS alternately transmit a beacon, the responder is not fixed. For example, if a station transmits a probe request frame on a channel 1 and receives a probe response frame on the channel 1, the station stores BSS-related information included in the received probe response frame, moves to a next channel (e.g., a channel 2), and may be able to perform scanning (i.e., transmit and receive a probe request/response on the channel 2) using an identical method.

Referring to FIG. 5, scanning can also be performed by a passive scanning scheme. According to the passive scanning, a scanning performing station waits for a beacon frame while switching a channel A beacon frame is one of management frames in IEEE 802.11. The beacon frame is periodically transmitted to notify the existence of a wireless network and make the scanning performing station discover and participate in the wireless network. In a BSS, an AP plays a role in periodically transmitting a beacon frame. In an IBSS, stations belonging to the IBSS alternately transmit a beacon frame. Having received a beacon frame, the scanning performing station stores information on the BSS included in the beacon frame and records beacon frame information on each channel while switching to a different channel. Having received a beacon frame, a station stores BSS-related information included in the received beacon frame, moves to a next channel, and may be able to perform scanning on the next channel using an identical method.

When the active scanning and the passive scanning are compared, the active scanning has a merit in that delay is less and power consumption is lower compared to the passive scanning.

After the network is discovered by the station, an authentication procedure can be performed in the step S420. In order to clearly distinguish the authentication procedure from a security setup operation of the step S440, the authentication procedure can be referred to as a first authentication procedure.

According to the authentication procedure, the station transmits an authentication request frame to the AP and the AP transmits an authentication response frame to the station in response to the authentication request frame. An authentication frame used in the authentication request/response corresponds to a management frame.

The authentication frame include information on an authentication algorithm number, an authentication transaction sequence number, a status code, a challenge text, an RSN (robust security network), a finite cyclic group, and the like. The above-mentioned information is just an example of information capable of being included in the authentication request/response. The information can be replaced with different information or may further include additional information.

The station can transmit the authentication request frame to the AP. The AP can determine whether to grant authentication on the station based on the information included in the received authentication request frame. The AP can transmit a result of the authentication procedure to the station via the authentication response frame.

If the station is successfully authenticated, an association procedure can be performed in the step S430. According to the association procedure, the station transmits an association request frame to the AP and the AP transmits an association response frame to the station in response to the association request frame.

For example, the association request frame can include such information as information related to various capabilities, a beacon listening interval, an SSID (service set identifier), supported rates, supported channels, an RSN, a mobility domain, supported operating classes, a TIM (traffic indication map broadcast request), interworking service capability, and the like.

For example, the association response frame can include such information as information related to various capabilities, a status code, an AID (association ID), supported rates, an EDCA (enhanced distributed channel access) parameter set, an RCPI (received channel power indicator), an RSNI (received signal to noise indicator), a mobility domain, a timeout interval (association comeback time), an overlapped BSS scan parameter, TIM broadcasting response, QoD map, and the like.

The above-mentioned information is just an example of information capable of being included in the association request/response frame. The information can be replaced with different information or may further include additional information.

If the station is successfully associated with the network, the security setup procedure can be performed in the step S540. The security setup procedure of the step S440 can also be referred to as an authentication procedure via an RSNA (robust security network association) request/response. The authentication procedure of the step S520 can be referred to as a first authentication procedure and the security setup procedure of the step S540 can be simply referred to as an authentication procedure.

For example, the security setup procedure of the step S440 may include a private key setup procedure via 4-way handshaking through an EAPOL (extensible authentication protocol over LAN) frame. And, the security setup procedure can also be performed according to a security scheme not defined in IEEE 802.11 standard.

Based on the aforementioned discussion, a collision detection technique in a WLAN system is explained in the following.

As mentioned in the foregoing description, since various elements influence on a channel in wireless environment, a transmitting end is unable to precisely detect a collision. Hence, 802.11 has introduced a DCF (distributed coordination function) corresponding to a CSMA/CA (carrier sense multiple access/collision avoidance) mechanism.

Figure 6:
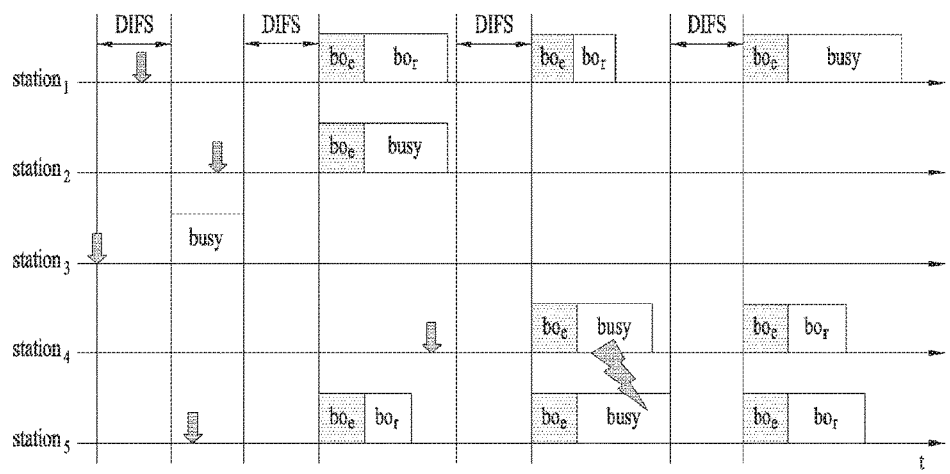
FIG. 6 is a diagram for explaining a DCF mechanism in a WLAN system.

FIG. 6 is a diagram for explaining a DCF mechanism in a WLAN system.

A DCF performs CCA (clear channel assessment) that senses a medium during a specific period (e.g., DIFS: DCF inter-frame space) before data is transmitted by stations including data to be transmitted. In this case, if a medium is idle (available), a station can transmit a signal using the medium. However, if a medium is busy (unavailable), a station can transmit data after waiting for a period as much as a random backoff period in addition to a DIFS under an assumption that many stations are waiting for the use of the medium. In this case, the random backoff period plays a role in avoiding a collision. If it is assumed that there are many stations to transmit data, each of the stations has a statistically different backoff interval value. Consequently, each of the stations has different transmission timing. If a station starts to transmit data using the medium, other stations are unable to use the medium.

A random backoff time and a procedure are briefly explained in the following.

If a state of a specific medium is switched to idle from busy, a plurality of stations start to prepare for data transmission. In this case, in order to minimize collision, each of a plurality of the stations intending to transmit data selects a random backoff count and waits for slot time as much as the random backoff count. The random backoff count is a pseudo-random integer value and the value is selected from among values uniformly distributed in a range of [0 CW]. In this case, the CW stands for 'contention window'.

A CW parameter selects a CWmin value as an initial value. If transmission fails, the CWmin value becomes twice the initial value. For example, if it fails to receive an ACK response in response to a transmitted data frame, it may consider it as a collision. If a CW value has a CWmax value, the CWmax value is maintained until data transmission is succeeded. The CW value is reset to the CWmin value when the data transmission is succeeded. In this case, in order to conveniently implement and operate the CW, the CWmin, and the CWmax, it is preferable to configure the CW, the CWmin, and the CWmax to be maintained by $2^n-1$.

Meanwhile, if a random backoff procedure starts, a station selects a random backoff count from among a range of [0 CW] and continuously monitors a medium while a backoff slot is countdown. If the medium is switched to a busy state, the station temporarily stops countdown. If the medium is switched back to the idle, the station resumes countdown of the backoff slot.

Referring to FIG. 6, many stations intend to transmit data. In case of a station 3, since a medium was idle as much as a DIFS, the station 3 immediately transmits a data frame and the rest of stations wait until the medium becomes idle. Since the medium was busy for a while, a plurality of stations are waiting for a chance of using the medium. Hence, each of a plurality of the stations selects a random backoff count. In this case, FIG. 6 shows a case that a station 2, which has selected a smallest backoff count, transmits a data frame.

After the transmission of the station 2 is finished, the medium becomes idle again and the stations resume countdown for the temporarily stopped backoff interval. Referring to FIG. 6, although a station 5, which has a next smallest random backoff count value and temporarily stopped countdown when the medium is busy, count downs the remaining backoff slot and transmits a data frame, it is overlapped with a random backoff count value of a station 4 by chance. It is able to see that a collision occurs. In this case, since both the station 5 and the station 4 are unable to receive an ACK response in response to a transmitted data, the stations select a random backoff count value again after CW is increased as much as twice.

As mentioned in the foregoing description, the most fundamental principle of the CSMA/CA is carrier sensing. A terminal is able to use physical carrier sensing and virtual carrier sensing to determine whether or not a DCF medium is busy/idle. The physical carrier sensing is performed at a PHY (physical layer) and the physical carrier sensing is performed through energy detection or preamble detection. For example, if it is determined as a receiving end has measured a power level or has read a preamble, it can be considered as a medium is busy. The virtual carrier sensing is performed by setting a NAV (network allocation vector) to make other stations not transmit data. The virtual carrier sensing is performed through a duration field value of a MAC header. Meanwhile, in order to reduce possibility of collision, a robust collision detection mechanism has been introduced. The reason for the introduction of the robust collision detection mechanism can be checked by two examples described in the following. For clarity, assume that a carrier sensing range is identical to a transmission range.

Figure 7:
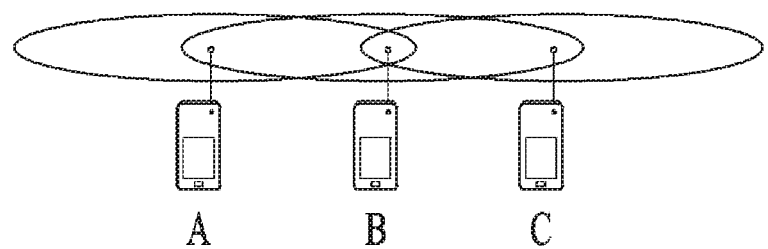
FIGS. 7 and 8 are diagrams of examples for explaining a problem of a legacy collision resolution mechanism.
Figure 8:
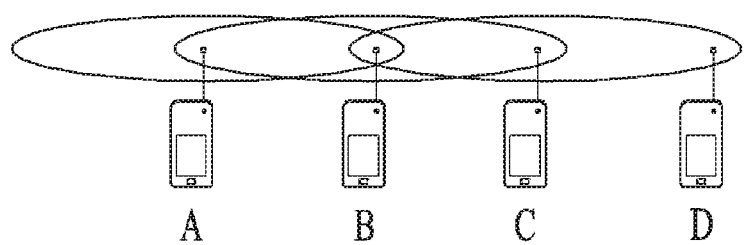

FIGS. 7 and 8 are diagrams of examples for explaining a problem of a legacy collision resolution mechanism.

Specifically, FIG. 7 is a diagram for explaining hidden node issues. The present example shows a case that a station A is communicating with a station B and a station C has information to be transmitted. Specifically, when the station A transmits information to the station B, since the station C is out of transmission range of the station A at the time of performing carrier sensing on a medium before transmitting data to the station B, the station C is unable to detect a signal transmitted by the station A and there is a possibility that the medium is considered as being in an idle state. As a result, since the station B receives information of the station A and information of the station C at the same time, a collision occurs. In this case, the station A can be regarded as a hidden node of the station C.

Meanwhile, FIG. 8 is a diagram for explaining exposed issues. Currently, the station B transmits data to the station A. In this case, when the station C performs carrier sensing, since the station B is in a state of transmitting information, the carrier sensing shows a result that a medium is busy. As a result, although the station C wants to transmit data to a station D, since the media is sensed as busy, the station C may unnecessarily wait until the medium becomes idle. In particular, although the station A is located at the outside of a CS range of the station C, the station A may block information transmission of the station C. In this case, the station C becomes an exposed node of the station B.

In order to make good use of a collision avoidance mechanism in the aforementioned situation, it may be able to introduce such a short signaling packet as RTS (request to send), CTS (clear to send), and the like. In particular, it may be able to use the short signaling packet to enable surrounding stations to overhear whether or not two stations transmit information. In particular, if a station intending to transmit data transmits an RTS frame to a station receiving the data, the receiving end station can inform surrounding terminals that the receiving end station is going to receive data by transmitting a CTS frame to the surrounding terminals.

Figure 9:
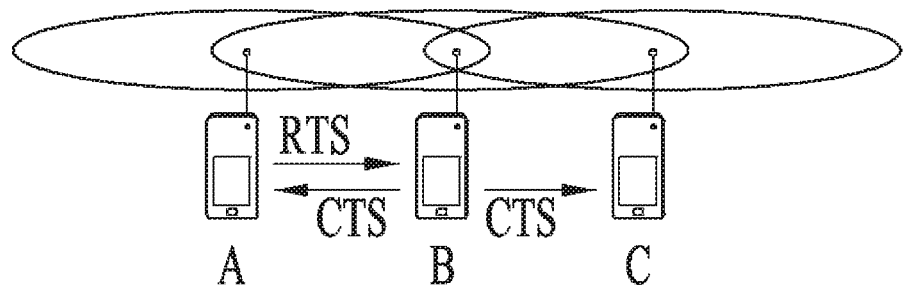
FIG. 9 is a diagram for explaining a mechanism of solving a hidden node issue using an RTS/CTS frame.

FIG. 9 is a diagram for explaining a mechanism of solving a hidden node issue using an RTS/CTS frame.

Referring to FIG. 9, both the station A and the station C intend to transmit data to the station B. If the station A sends RTS to the station B, the station B sends CTS to both the station A and the station C located near the station B. As a result, the station C waits until data transmission between the station A and the station B is finished. By doing so, it is able to avoid a collision.

Figure 10:
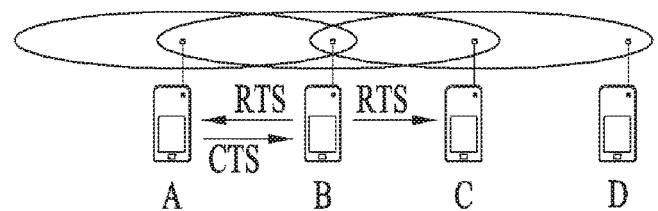
FIG. 10 is a diagram for explaining a mechanism of solving an exposed node issue using an RTS/CTS frame.

FIG. 10 is a diagram for explaining a mechanism of solving an exposed node issue using an RTS/CTS frame.

Referring to FIG. 10, the station C overhears RTS/CTS transmission between the station A and the station B. By doing so, although the station C transmits data to a different station D, the station C is able to know that a collision does not occur. In particular, the station B transmits RTS to all terminals located near the station B and transmits CTS to the station A only to which data is to be practically transmitted. Since the station C receives the RTS and does not receive the CTS of the station A, the station C is able to know that the station A is located at the outside of a CS range of the station C.

Figure 11:
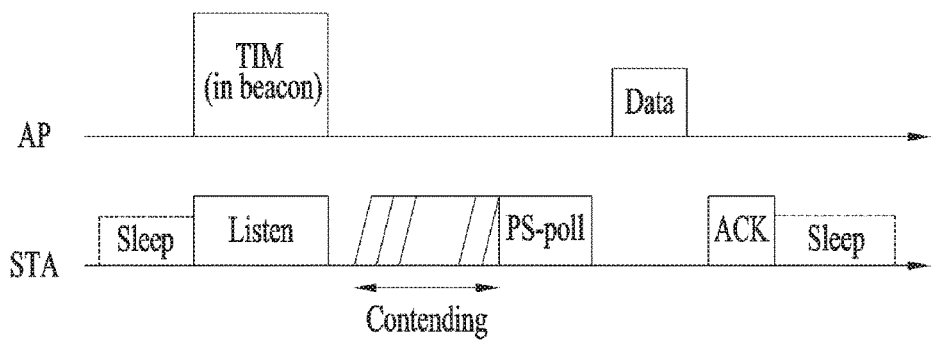
FIGS. 11 to 13 are diagrams for explaining an operation of a station which has received TIM.
Figure 12:
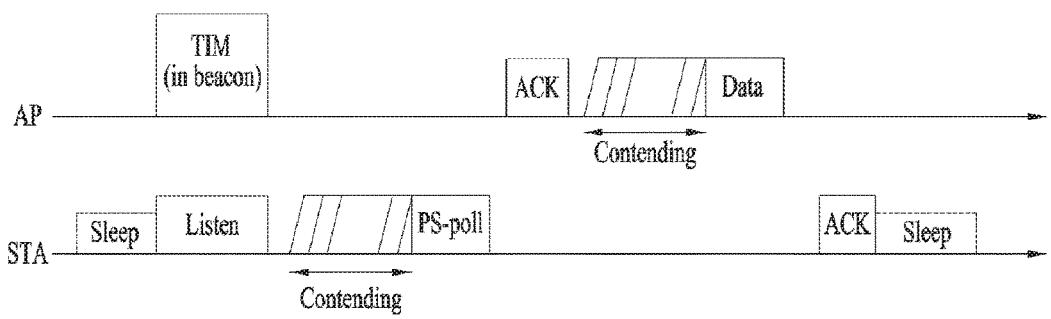
Figure 13:
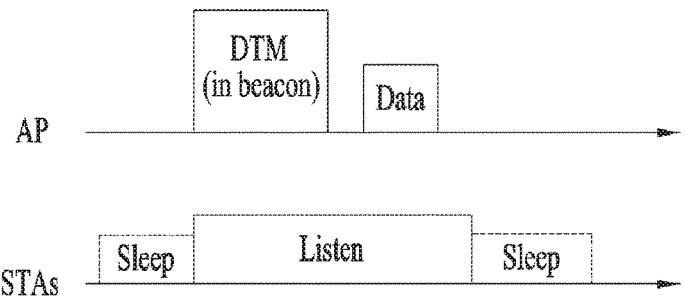
Figure 14:
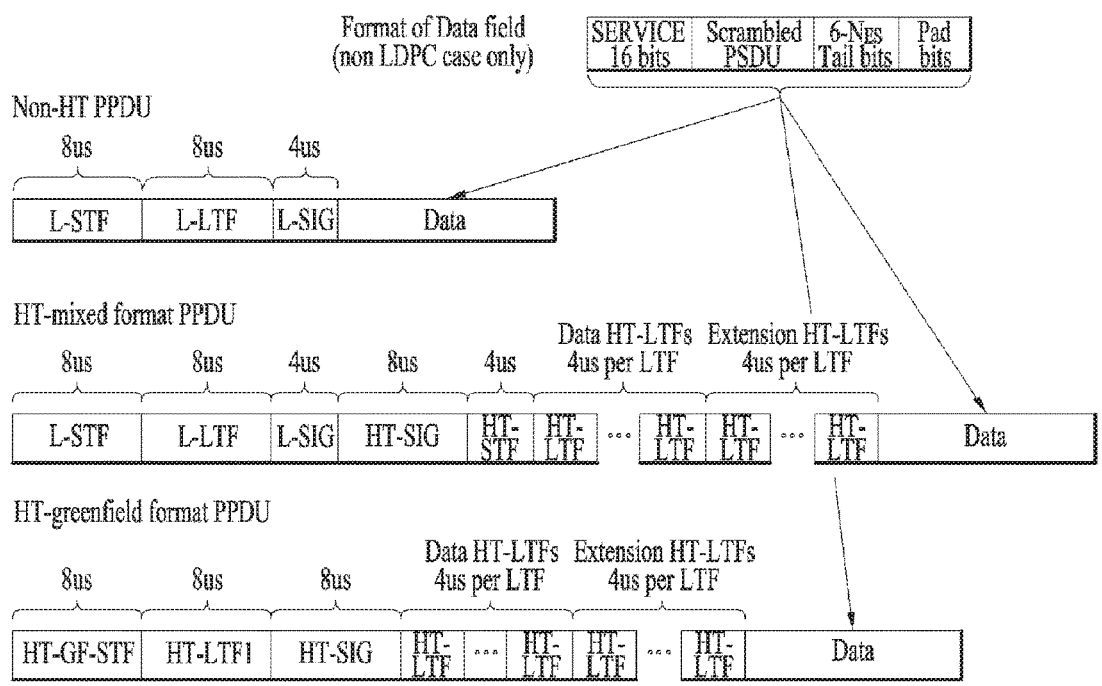

FIGS. 11 to 13 are diagrams for explaining an operation of a station which has received TIM.

Referring to FIG. 11, a station switches to an awake state from a sleep state to receive a beacon frame including a TIM from an AP and interprets the received TIM element. By doing so, the station is able to know there is a buffered traffic to be transmitted to the station. The station performs contending with other stations to access a medium for transmitting a PS-poll frame and may be then able to transmit the PS-poll frame to request data frame transmission to the AP. Having received the PS-poll frame transmitted by the station, the AP can transmit a frame to the station. The station receives a data frame and may be able to transmit a confirmation response (ACK) to the AP in response to the data frame. Subsequently, the station can switch back to the sleep state.

As shown in FIG. 11, having received the PS-poll frame from the station, the AP may operate according to an immediate response scheme that a data frame is transmitted after prescribed time (e.g., SIFS (short-inter-frame space)). Meanwhile, after the AP receives the PS-poll frame, if the AP fails to prepare a data frame to be transmitted to the station during SIFS time, the AP may operate according to a deferred response scheme. Regarding this, it is explained in the following with reference to FIG. 12.

In the example shown in FIG. 12, similar to the example of FIG. 11, the station switches to the awake state from the sleep state, receives a TIM from the AP, performs contending with other stations, and transmits the PS-poll frame to the AP. If the AP fails to prepare a data frame during SIFS after the PS-poll frame is received, the AP can transmit an ACK frame instead of the data frame to the station. If the data frame is ready after the ACK frame is transmitted, the AP can transmit the data frame to the station after contending is performed. The station transmits an ACK frame to the AP to indicate that the data frame is successfully received and can switch back to the sleep state.

FIG. 13 shows an example that the AP transmits a DTIM. Stations can switch to the awake state from the sleep state to receive a beacon frame including a DTIM element from the AP. Having received the DTIM, the stations are able to know that a multicast/broadcast frame is to be transmitted. After the beacon frame including the DTIM is transmitted, the AP can immediately transmit data (i.e., the multicast/broadcast frame) without an operation of transmitting and receiving a PS-poll frame. Having received the beacon frame including the DTIM, the stations receive data while continuously maintaining the awake state and may be able to switch back to the sleep state after the data reception is completed.

FIGS. 14 to 18 are diagrams for explaining an example of a frame structure used in IEEE 802.11 system.

A station (STA) can receive a PPDU (physical layer convergence protocol (PLCP) packet data unit). In this case, a PPDU frame format can be configured in a manner of including an STF (short training field), an LTF (long training field), an SIG (signal) field, and a data field. In this case, as an example, the PPDU frame format can be configured based on a type of the PPDU frame format.

As an example, a non-HT (high throughput) PPDU frame format can be configured by an L-STF (legacy-STF) field, an L-LTF (legacy-LTF) field, an SIG field, and a data field only.

And, the type of the PPDU frame format can be configured by either a HT-mixed format PPDU or a HT-greenfield format PPDU. In this case, the aforementioned PPDU format can further include an additional (a different type of) STF, LTF, and an SIG field between the SIG field and the data field.

Figure 15:
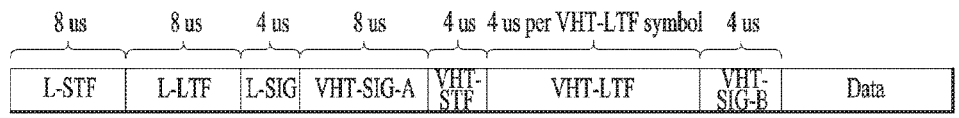

Referring to FIG. 15, it may be able to configure a VHT (very high throughput) PPDU format. In this case, the VHT PPDU format can also further include an additional (a different type of) STF, LTF, and an SIG field between the SIG field and the data field. More specifically, the VHT PPDU format can include at least one of a VHT-SIG-A field, a VHT-STF field, a VHT-LTF field, and a VHT-SIG-B field between the L-SIG field and the data field.

In this case, the STF may correspond to a signal for signal detection, AGC (automatic gain control), diversity selection, minute time synchronization, and the like. And, the LTF may correspond to a signal for channel estimation, frequency error estimation, and the like. In this case, both the STF and the LTF can be referred to as a PCLP preamble. The PCLP preamble may correspond to a signal for OFDM physical layer synchronization and channel estimation.

Figure 16:
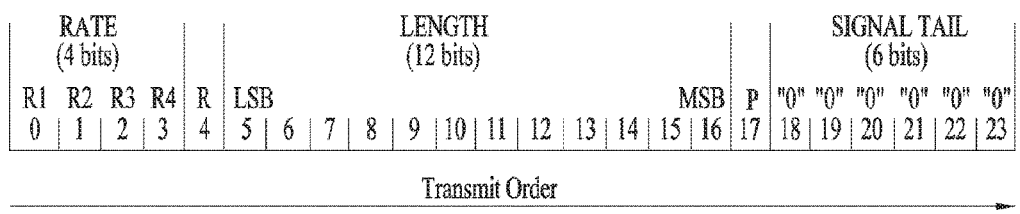

Referring to FIG. 16, the SIG field can include a RATE field, a LENGTH field, and the like. The RATE field can include information on modulation and a coding rate of a data. The LENGTH field can include information on a data length. In addition, the SIG field can include a parity bit, an SIG TAIL bit, and the like.

The data field can include a SERVIVE field, a PSDU (PLCP service data unit), a PPDU TAIL bit. If necessary, the data field can further include a padding bit.

Figure 17:
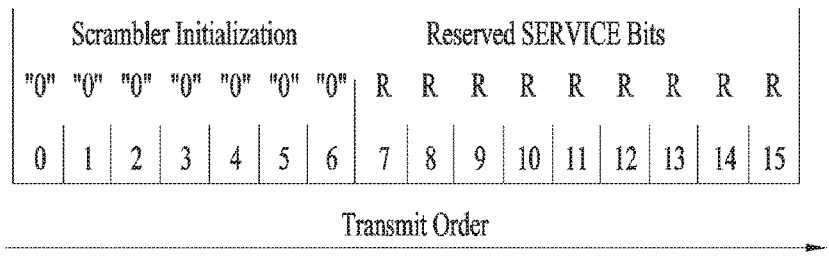

In this case, referring to FIG. 17, a partial bit of the SERVICE field can be used for synchronization of a descrambler in a receiving end and a partial bit can be configured by a reserved bit. The PSDU corresponds to a MAC PDU (protocol data unit) defined in a MAC layer and can include data generated/used in a higher layer. The PPDU TAIL bit can be used for returning an encoder to a zero state. The padding bit can be used for matching a length of a data field with a prescribed unit.

And, as mentioned in the foregoing description, the VHT PPDU format can include an additional (or a different type of) STF, LTF, and an SIG field. In this case, L-STF, L-LTF, and L-SIG may correspond to a part of non-VHT in the VHT PPDU. In this case, VHT-SIG A, VHT-STF, VHT-LTF, and VHT-SIG may correspond to a part of VHT in the VHT PPDU. In particular, a field for the non-VHT and a region for the VHT field can be respectively defined in the VHT PPDU. In this case, as an example, the VHT-SIG A can include information for interpreting the VHT PPDU.

In this case, as an example, referring to FIG. 18, the VHT-SIG A can be configured by VHT SIG-A1 (FIG. 18 (a)) and VHT SIG-A2 (FIG. 18 (b)). In this case, each of the VHT SIG-A1 and the VHT SIG-A2 can be configured by 24 data bits and the VHT SIG-A1 can be transmitted prior to the VHT SIG-A2. In this case, the VHT SIG-A1 can include a BW field, an STBC field, a group ID field, an NSTS/partial AID field, a TXOP_PS_NOT_ALLOWED field, and a reserved field. And, the VHT SIG-A2 can include a short GI field, a short GI NSYM disambiguation field, an SU/MU[0] codign field, an LDPC extra OFDM symbol field, an SU VHT-MCS/MU[1-3] coding field, a beamformed field, a CRC field, a tail field, and a reserved field. Through the aforementioned fields, it may be able to check information on the VHT PPDU.

FIGS. 19 to 21 are diagrams for an MAC frame format.

A station is able to receive PPDU based on one of the aforementioned PPDU formats. In this case, a PSDU of a data part of a PPDU frame format can include a MAC PDU. In this case, the MAC PDU is defined according to various MAC frame formats. A basic MAC frame can include a MAC header, a frame body, and a FCS (frame check sequence).

In this case, as an example, referring to FIG. 19, the MAC header can include a frame control field, a duration/ID field, an address field, a sequence control field, a QoS control field, an HT control sub field, and the like. In this case, the frame control field of the MAC header can include control information necessary for transmitting and receiving a frame. The duration/ID field can be configured by time necessary for transmitting the frame. And, the address field can include identification information for a sender and a receiver. Regarding this, it shall be described later. For the sequence control field, the QoS control field, and the HT control field, it may refer to IEEE 802.11 standard document.

In this case, as an example, the HT control field may have two forms including HT variant and VHT variant. In this case, information included in the HT control field may vary according to each form of the HT control field. Referring to FIGS. 20 and 21, a VHT subfield of the HT control field may indicate a form of the HT control field among the HT variant and the VHT variant. In this case, as an example, if the VHT subfield has a value of '0', it may indicate the HT variant form. If the VHT subfield has a value of '1', it may indicate the VHT variant form.

In this case, as an example, referring to FIG. 20, if the HT control field has the HT variant form, the HT control field can include a link adaptation control field, a calibration position field, a calibration sequence field, a CSI/steering field, an HT NDP announcement field, an AC constraint field, an RDG/more PPDU field, and a reserved field. In this case, as an example, referring to FIG. 20 (b), the link adaptation control field can include a TRQ field, an MAI field, an MFSI field, and an MFB/ASELC field. For more details, it may refer to IEEE 802.11 standard document.

And, as an example, referring to FIG. 21, if the HT control field has the VHT variant form, the HT control field can include an MRQ field, an MSI field, an MFSI/GID-LM field, an MFB GID-H field, a coding type field, an FB Tx type field, an unsolicited MFB field, an AC constraint field, an RDG/more PPDU field, and a reserved field. In this case, as an example, referring to FIG. 21 (b), the MFB field can include a VHT N_STS field, an NCS field, a BW field, an SNR field, and the like.

FIG. 22 is a diagram for a short MAC frame format. A MAC frame can be configured by a form of a short MAC frame to prevent waste of a radio resource by reducing unnecessary information according to necessity. In this case, as an example, referring to FIG. 22, a frame control field, an A1 field, and an A2 field can be always included in an MAC header of a short frame. And, a sequence control field, an A3 field, and an A4 field can be optionally included in the MAC header of the short frame. By doing so, it is able to prevent waste of a radio resource by omitting information not required by the MAC frame.

In this case, as an example, the frame control field of the MAC header can include a Protocol version field, a Type field, a PTID/subtype field, a From DS field, a More fragment field, a Power management field, a More data field, a Protected frame field, an End of service period field, a Relayed frame field, and an Ack policy field, and the like. For contents of each sub field of the frame control field, it may refer to IEEE 802.11 standard document.

Meanwhile, the Type field of the frame control field of the MAC header is configured by 3 bits. Values ranging from 0 to 3 include a configuration for each of address information and values ranging from 4 to 7 can be reserved. In relation to this, according to the present invention, new address information can be indicated via a reserved value. Regarding this, it shall be described later.

And, the From DS field of the control frame field of the MAC header can be configured by 1 bit.

Besides, the More fragment field, the Power management field, the More data field, the Protected frame field, the End of service period field, the Relayed frame field, and the Ack policy field can be configured by 1 bit. In this case, the Ack policy field corresponds to ACK/NACK information and can be configured by 1 bit.

In relation to stations including a frame configured by the aforementioned form, a VHT AP (access point) station can support a non-AP VHT station operating in a TXOP (transmit opportunity) power save mode in a BSS. In this case, as an example, the non-AP VHT station is in an active state and may operate in the TXOP power save mode. In this case, the AP VHT station can make the non-AP VHT station switch to an inactive state (doze) during TXOP. As an example, the AP VHT station sets TXOP_PS_NOT_ALLOWED corresponding to a TXVECTOR parameter to 0 and transmits VHT PPDU to indicate that the non-AP VHT station is switched to the inactive state. In this case, parameters included in the TXVECTOR, which are transmitted by the AP VHT station together with the VHT PPDU, can be maintained in a manner of being changed to 0 from 1 during the TXOP. By doing so, it may be able to perform power saving during the remaining TXOP.

On the contrary, if the TXOP_PS_NOT_ALLOWED is set to 1 and power saving is not performed, the parameters included in the TXVECTOR can be maintained without being changed.

And, as mentioned in the foregoing description, if the non-AP VHT station is switched to the inactive state during the TXOP in the TXOP power save mode, it may be able to satisfy the following conditions.

A case of receiving VHT MU PPDU, i.e., a case that a station is not indicated as a group member by a group_ID corresponding to RXVECTOR parameter A case of receiving SU PPDU, i.e., a case that PARTIAL_AID (RXVECTOR parameter) of a station is not 0 or is not matched with a partial AID of the station A case that an address of a receiver belonging to a MAC header is not matched with a MAC address of a station although it is determined as PARTIAL_AID (RXVECTOR parameter) of the station is matched with a partial AID of the station A case of setting NUM_STS (RXVECTOR parameter) to 0 although a station is indicated as a group member by GROUP_ID corresponding to RXVECTOR parameter A case of receiving VHT NDP announcement frame, a case of setting PARTIAL_AID (RXVECTOR parameter) of a station to 0, and a case that AID belonging to Info field of the station is not matched A case of setting More Data field of a station to 0, a case that Ack Policy subfield receives a frame configured as No Ack, and a case that Ack Policy subfield transmits ACK in a state not corresponding to No Ack.

In this case, AP VHT station can include a Duration/ID value configured by the remaining TXOP duration and NAV-SET sequence (e.g., RTS/CTS). In this case, the AP VHT station may not transmit a frame to a non-AP VHT station which is switched to inactive state based on the aforementioned condition during the remaining TXOP.

And, as an example, if the AP VHT station sets TXOP_PS_NOT_ALLOWED corresponding to a TXVECTOR parameter to 0 and transmits the parameter in an identical TXOP and the AP VHT station wants a station not to be changed to an inactive state from an active state, the AP VHT station may not transmit VHT SU PPDU.

And, as an example, the AP VHT station may not transmit a frame to a VHT station switched to the inactive state before NAV configured at the time of the start of TXOP is expired.

In this case, when the More data field is set to 0, if the AP VHT station transmits a frame including at least one of MSDU, A-MSDU, and MMPDU and fails to receive ACK in response to the frame, the frame can be retransmitted at least one more time in an identical TXOP. In this case, as an example, if it fails to receive ACK in the last frame of the identical TXOP in response to the retransmission of the frame, the frame can be retransmitted after waiting until a next TXOP.

And, as an example, the AP VHT station may be able to receive a BlockAck frame from a VHT station operating in a TXOP power save mode. In this case, the BlockAck frame may correspond to a response for A-MPDU including MPDU of which the More Data field is set to 0. In this case, since the AP VHT station is in an inactive state, it may be difficult for the AP VHT station to receive a response of a subsequence of the MPDU, which is retransmitted during the identical TXOP.

And, it is able to make a VHT station, which is operating in a TXOP power save mode and is switched to an inactive state, operate during a state that a NAV timer is inactivated. In this case, as an example, if the timer is expired, the VHT station can be switched to the awake state.

And, if the NAV timer is expired, the station can perform contending for accessing a medium.

FIG. 23 is a diagram for an example of a PPDU format. As mentioned in the foregoing description, a type of a PPDU format can be variously configured. In this case, as an embodiment, it may be able to provide a PPDU format of a new form. In this case, PPDU can include an L-STF field, an L-LTF field, an L-SIG field, and a data field. In this case, as an example, a PPDU frame can further include an HE (high efficiency) SIG-A field, a HE-STF field, a HE-LTF field, and a HE-SIG B field. In this case, as an example, the HE SIG-A field can include common information. As an example, the common information can include a bandwidth field, a GI (guard interval) field, a length field, a BSS color field, and the like. In this case, as an example, the L part (L-STF, L-LTF, and L-SIG) can be transmitted in an SFN form in a unit of 20 MHz in frequency domain. And, as an example, similar to the L part, the HE SIG A can also be transmitted in an SFN form in a unit of 20 MHz. As an example, if a channel is wider than 20 MHz, the L part and the HE SIG A can be transmitted in a unit of 20 MHz in a manner of being duplicated. And, the HE SIG-B may correspond to user-specific information. In this case, as an example, the user-specific information can include station AID, resource allocation information (e.g., allocation size), MCS, Nsts, coding, STBC, TXBF, and the like. And, as an example, the HE SIG-B can be transmitted over the whole bandwidth.

As an example, referring to FIG. 23 (b), PPDU can be transmitted on a band of 80 Mhz. In this case, the L part and the HE SIG A can be transmitted in a unit of 20 Mhz in a manner of being repeated (duplicated) and the HE SIG-B can be transmitted over the whole of the band of 80 Mhz. Yet, the aforementioned method is just an example only. The present invention is not restricted by the aforementioned embodiment.

Figure 24:
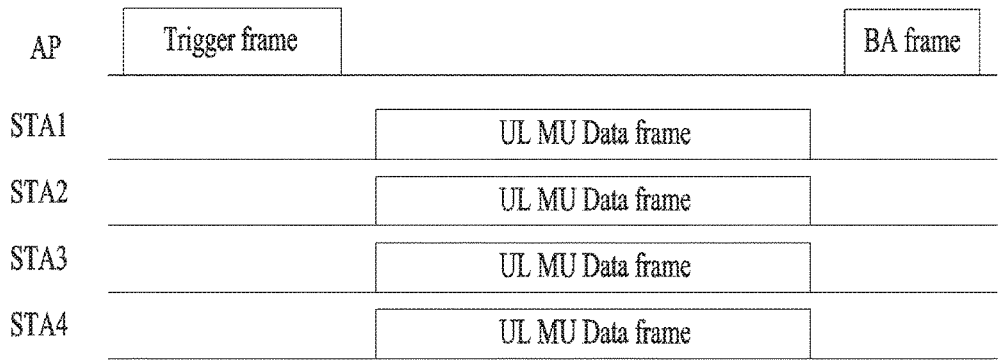
FIG. 24 is a diagram for a method of performing uplink multi-user (UL MU) transmission in an AP station and a non-AP station.

FIG. 24 is a diagram for a method of performing uplink multi-user (UL MU) transmission in an AP station and a non-AP station.

As mentioned in the foregoing description, an AP acquires TXOP capable of accessing a medium, occupies the medium via contending, and may be then able to transmit a signal. In this case, referring to FIG. 24, an AP station can transmit a trigger frame to a plurality of stations to perform UL MU transmission. In this case, as an example, the trigger frame can include information on a location and a size of resource allocation, IDs of stations, MCS, and MU type (=MIMO, OFDMA) as UL MU allocation information. In particular, the AP station transmits the trigger frame to a plurality of stations and makes a plurality of the stations perform uplink data transmission via the trigger frame. In this case, as an example, a plurality of the stations can transmit data to the AP after SIFS elapses based on a format indicated by the trigger frame. Subsequently, the AP can transmit ACK/NACK information to the stations and the stations can perform UL MU transmission via the ACK/NACK information.

Figure 25:
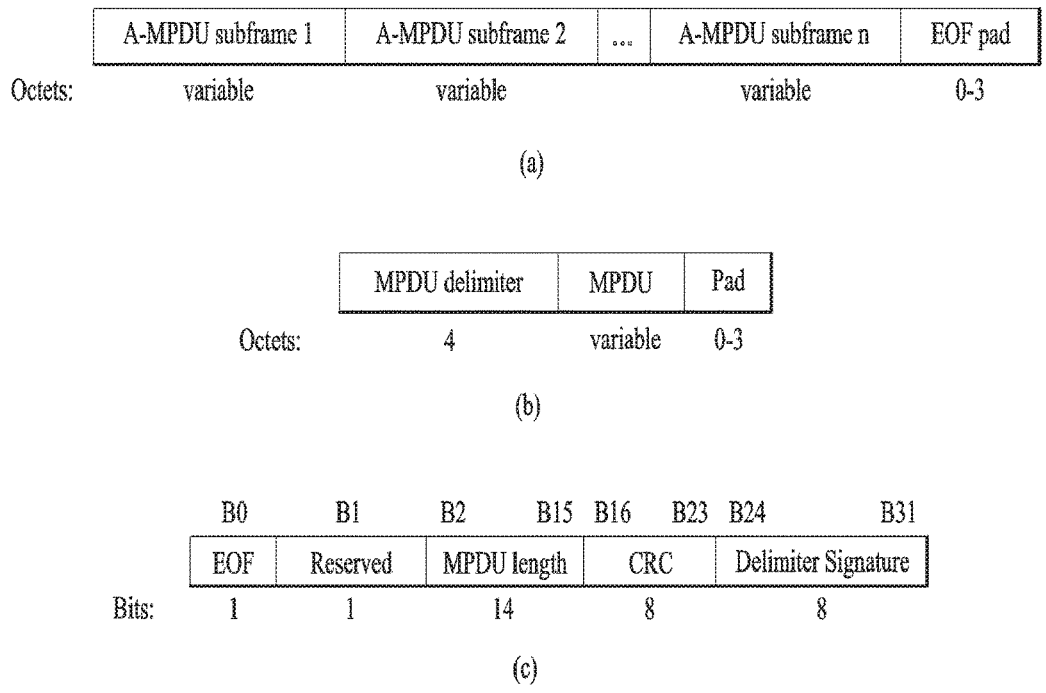
FIG. 25 is a diagram of an A-MPDU (aggregate-MPDU) frame structure for transmitting UL MU transmission.

FIG. 25 is a diagram of an A-MPDU (aggregate-MPDU) frame structure for transmitting UL MU transmission. In UL MU transmission, each of a plurality of stations receives information on a resource allocated to each of a plurality of the stations and may be able to perform data transmission at the same time. To this end, it may use an A-MPDU format. More specifically, referring to FIG. 25 (a), the A-MPDU format can include a plurality of A-MPDU sub frame fields, and an EOF (end of frame) pad field. In this case, information on each of a plurality of the stations can be delivered via each of a plurality of the A-MPDU subframes. In this case, as an example, referring to FIG. 25 (b), the A-MPDU subframe can include an MPDU delimiter field, an MPDU field, and a PAD field. And, as an example, referring to FIG. 25 (c), the MPDU delimiter field can include an EOF field, an MPDU length field, a CRC field, a delimiter signature field, and a reserved field.

As an example, the EOF field can be configured by 1 bit. In this case, the EOF field may correspond to a field for asking whether or not an A-MPDU subframe is located at the last of a frame. In this case, as an example, the A-MPDU subframe of which the MPDU length field is set to 0 and the EOF field is set to 1 can be located at the ahead of a different A-MPDU subframe of which the EOF field is set to 0. In particular, the A-MPDU subframe of which the MPDU length field is set to 0 and the EOF field is set to 1 may correspond to the last A-MPDU subframe of a frame.

And, the MPDU length field may correspond to a field indicating a length of MPDU. In this case, if the MPDU length field is set to 0, MPDU may not exist. And, as an example, an A-MPDU subframe of which the MPDU length field is set to 0 can be used for indicating a start frame or a last frame.

And, the delimiter signature field can be formed by an independent pattern to search for an MPDU delimiter. In particular, the delimiter signature field may correspond to a field for identifying each of A-MPDU subframes.

Random Access in WLAN System

In the following, if there is no such a specific restriction as an AP, such a terminology as an STA can be used for indicating a non-AP STA.

Discussion on an OFDMA technology is in progress in IEEE 802.11ax. If UL MU (multi user)-OFDMA technology is applied, an STA can perform transmission using a bandwidth narrower than 20 MHz corresponding to a minimum transmission bandwidth of EDCA (enhanced distributed channel access). In a state that transmit power of an STA similar to 20 MHz bandwidth transmission is maintained, if the STA performs transmission using a bandwidth narrower than 20 MHz, transmission distance of the STA increases.

Figure 26:
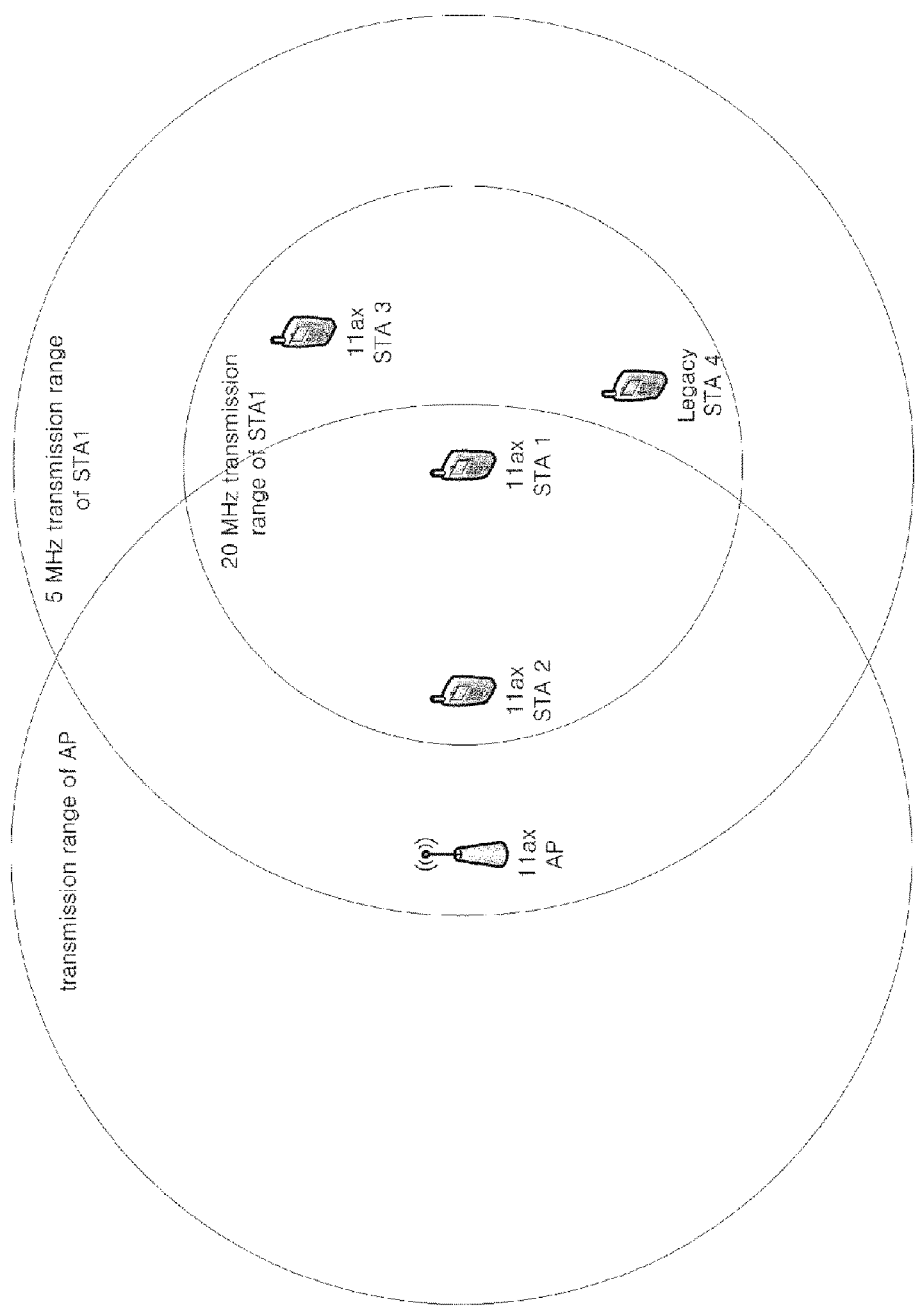
FIG. 26 is a diagram for network environment according to one embodiment of the present invention.

FIG. 26 is a diagram for network environment according to one embodiment of the present invention.

Since transmit power of an AP is stronger than transmit power of an STA, transmission distance of the AP is longer than transmission distance of the STA, which performs transmission using a bandwidth of 20 MHz, although the AP performs transmission in a broadband. Yet, if the STA performs transmission using a bandwidth narrower than 20 MHz using the OFDMA technology, transmission distance of the STA increases compared to a case that the STA performs transmission using the bandwidth of 20 MHz. Hence, it may be able to secure transmission distance equal to transmission distance of the AP.

Referring to FIG. 26, an STA1 is located at a distance capable of receiving a signal from 802.11ax AP and the distance incapable of transmitting a signal to the AP using a bandwidth of 20 MHz. As mentioned above, if an STA is able to transmit a signal to an AP via a minimum bandwidth (e.g., 20 MHz) of the EDCA scheme and the STA is able to transmit a signal to the AP via a band (e.g., less than 20 MHz) narrower than the minimum bandwidth of the EDCA scheme, communication between the STA and the AP is defined as random access-based communication.

In FIG. 26, although the STA1 is able to perform passive scanning, the STA1 is unable to detect the 802.11ax AP through active scanning. This is because, if the STA1 follows a legacy scheme, the active scanning should be performed using 20 MHz bandwidth. Yet, if the STA1 transmits a signal using a bandwidth (e.g., 5 MHz) narrower than 20 MHz, since transmission distance increases, the signal can be transmitted to the AP. Although FIG. 26 shows the bandwidth of 5 MHz for clarity, if a bandwidth is narrower than 20 MHz, embodiments described in the following can be applied to the present invention. In particular, the present invention is not restricted by the bandwidth of 5 MHz.

As mentioned in the foregoing description, if a minimum transmission bandwidth of an STA is restricted by 20 MHz in UL SU (single user)-OFDM transmission, transmission distance of the UL SU-OFDM transmission becomes shorter than transmission distance of UL MU-OFDMA transmission. The association procedure of the legacy 802.11 system supports SU transmission only. Hence, if an STA follows the legacy association procedure, the STA should perform the SU transmission-based association procedure from a distance close to an AP. By doing so, the STA can perform UL MU-OFDMA transmission at last. Consequently, if the STA performs the association procedure using the SU scheme from a distance close to the AP and a case of performing transmission using the UL MU-OFDMA scheme from a remote distance is excluded, an effect of increasing transmission distance using the UL MU-OFDMA technology is not big.

Hence, it is necessary to support scanning and association of IEEE 802.11ax STA in a distance longer than a transmission distance according to the legacy SU-OFDM 20 MHz bandwidth.

Random Access-Based Active Scanning Procedure

According to one embodiment of the present invention, for example, if an STA1 performs active scanning using a bandwidth of 5 MHz, a transmission distance may increase.

FIGS. 27A, 27B, 27C, and 27D are diagrams for active scanning procedures according to embodiments of the present invention.

Referring to FIG. 27A, first of all, an AP designates probing duration for active scanning by periodically transmitting a trigger frame. The probing duration starts immediately after the trigger frame is transmitted by the AP and the probing duration is valid for time specified by the trigger frame. Among STAs, which have received the trigger frame and not associated yet, an STA intending to receive network information of the AP or an STA intending to get associated transmits a probe request frame during the probing duration. After the probing duration ends, the AP transmits a probe response frame to the STAs, which have transmitted the probe request frame during the probing duration. In this case, MU-OFDMA technique or MU-MIMO technique can be used.

According to a different embodiment of the present invention, as shown in FIG. 27B, a probe request frame and ACK can be contiguously transmitted with an SIFS interval after a trigger frame is transmitted. In FIG. 27A, an STA transmits a probe request frame via contention. On the contrary, according to FIG. 27B, an STA randomly determines a transmission order of the STA and transmits a probe request frame with an SIFS interval according to the transmission order. If a collision occurs due to the same transmission orders determined by a plurality of STAs, the AP does not transmit ACK. Hence, the STAs are able to know whether or not a collision occurs.

Figure 27C:
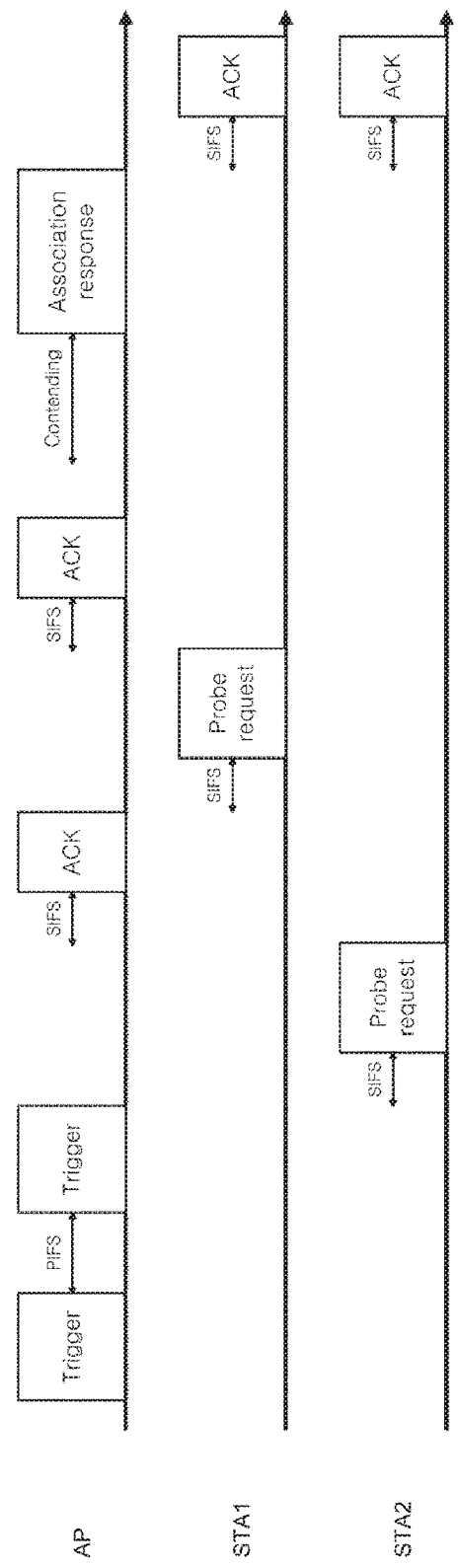

Meanwhile, referring to FIG. 27C, no STA can transmit a probe request frame at a specific order. The AP transmits a trigger frame again after a PIFS interval from a previous trigger frame to maintain TXOP.

Figure 27D:
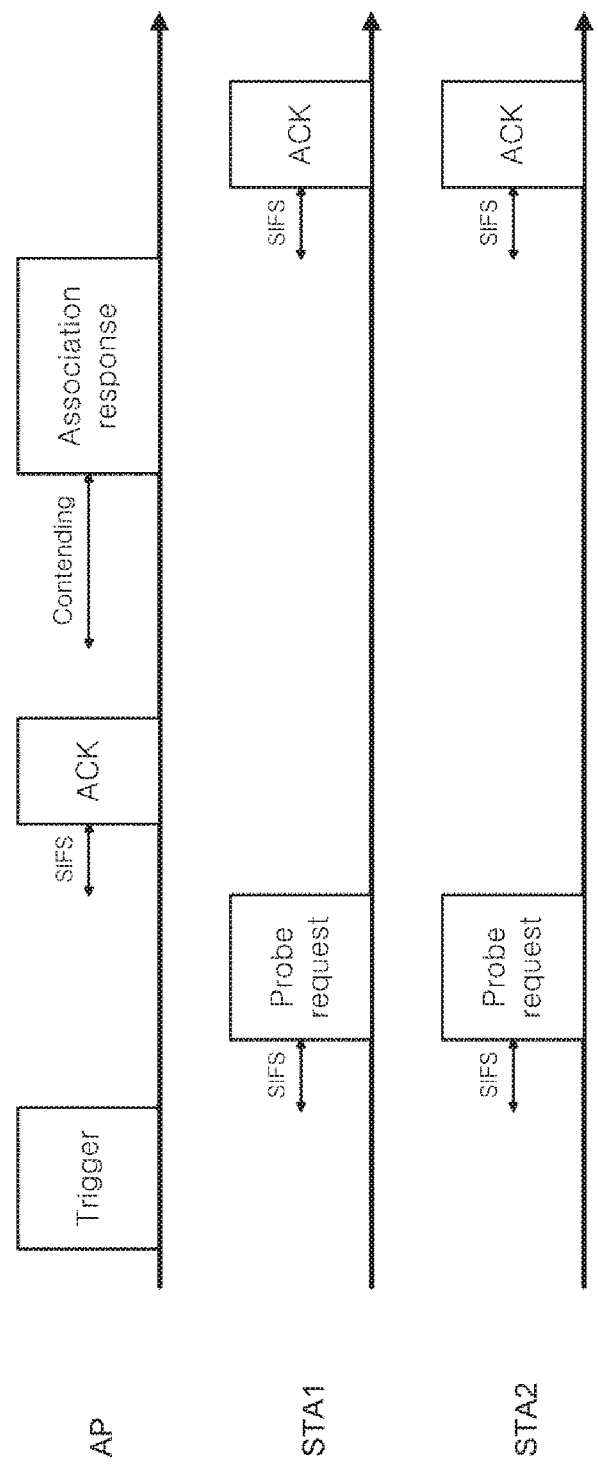

On the contrary, referring to FIG. 27D, STAs can perform MU transmission after an SIFS from a trigger frame. In this case, the STAs can determine a sub channel to be randomly transmitted by the STAs or a resource unit for random access. In this case, each of the STAs selects a backoff count value for random access and reduces the backoff count value by 1 in response to every resource unit for random access. When the backoff count value becomes 0, each of the STAs can perform random access by randomly selecting a resource unit from among resource units allocated in a specific trigger frame. Contents of the present invention can be applied irrespective of a backoff procedure for random access.

If the number of STAs intending to transmit a probe request frame is not small, collision may frequently occur. In order to distribute the STAs, the AP can indicate a section of MAC addresses of STAs capable of performing transmission via a trigger frame. An STA can perform transmission only when an MAC address of the STA corresponds to one of the MAC addresses indicated by the trigger frame. If the MAC address of the STA is not indicated by the trigger frame, the STA may wait for a next trigger frame or move to a different channel.

Or, the AP may transmit a random value for determining an STA capable of performing transmission via a trigger frame. For example, if the AP transmits 15 and 7, an STA selects a random value from among 0 to 15. In this case, if an STA, which has selected a value equal to or less than 7, is configured to perform transmission only, it may be able to reduce collision.

The aforementioned collision resolution method of the STAs can also be allied to STAs already associated. For example, the present embodiment can be applied when an STA operating in a power saving mode receives TIM information of a beacon frame and then transmits a PS-poll frame. Regarding this, it is explained in detail in the following with reference to FIG. 27E.

Figure 27E:
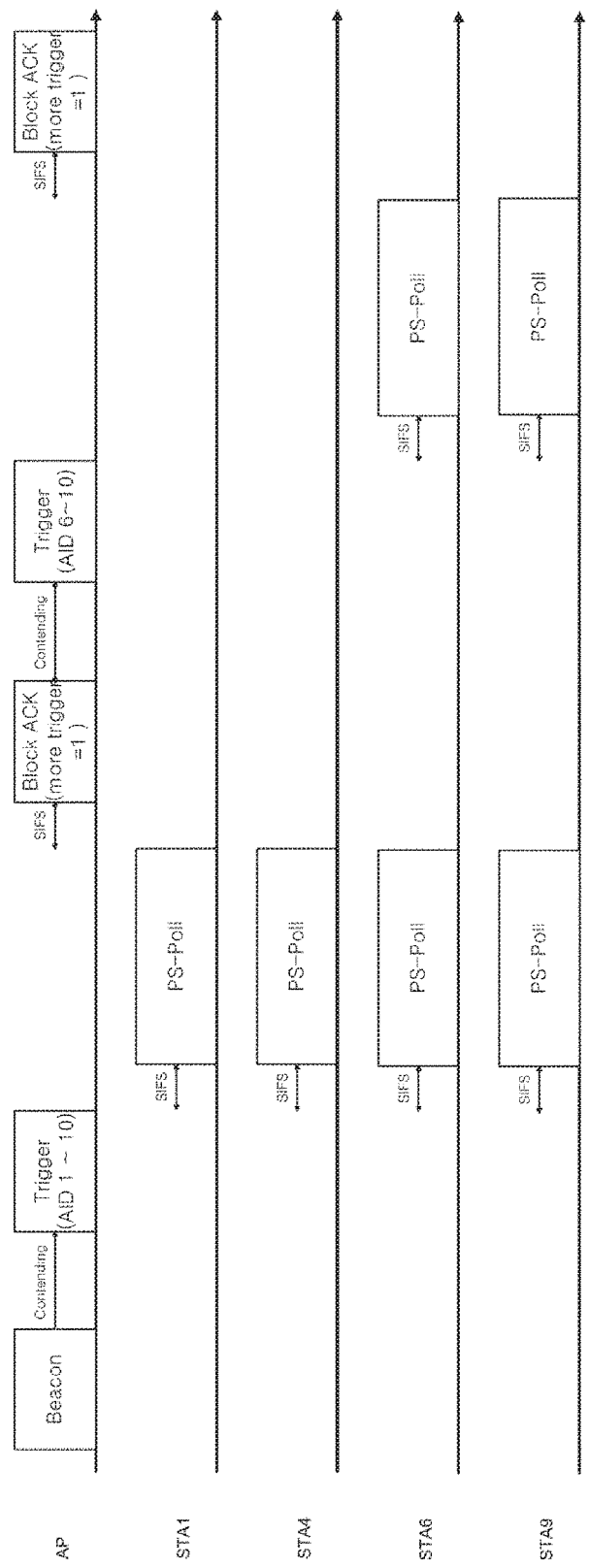
FIG. 27E is a diagram for a PS-Poll procedure according to one embodiment of the present invention.

FIG. 27E is a diagram for a PS-Poll procedure according to one embodiment of the present invention.

Referring to FIG. 27E, an AP informs STAs 1, 4, 6, and 9 of the existence of a buffered DL frame via TIM of a beacon frame. In this case, 1, 4, 6, and 9 may correspond to AIDs of the STAs.

An STA checks whether or not the STA is able to transmit a PS-poll frame by receiving a trigger frame which is transmitted immediately after the beacon frame. Assume that a range of AIDs of STAs capable of transmitting the PS-poll frame in the trigger frame is restricted by 1 to 10. In this case, all of the STAs 1, 4, 6, and 9 can perform transmission. The STAs 1, 4, 6, and 9 randomly select a frequency resource to transmit the PS-poll frame. Or, the STAs can perform a backoff procedure for random access. When the backoff count becomes 0, the STAs can randomly access a resource unit for random access. In this case, such a technique as MU-MIMO, MU-OFDMA, and the like can be applied.

In the present example, assume that all of the STAs 1, 4, 6, and 9 have transmitted the PS-poll frame and a collision has occurred in a part of resources. The AP can determine that the collision occurs due to a plurality of STAs intending to transmit the PS-poll frame and an error occurs in the received PS-poll frame. The AP includes information (e.g., 'more trigger bit') indicating that an additional trigger frame is to be transmitted in a block ACK frame in response to the PS-poll frame. An STA checks the 'more trigger bit' field of the block ACK frame, if the field is set to 1, the STA waits for an additional trigger frame. Among a legacy frame control field, 'More data' or 'Retry bit' can be used for the 'more trigger bit' of the block ACK frame. This is because 'More data' or 'Retry bit' of the legacy frame control field is not used in case of Block ACK.

Meanwhile, the AP can prevent a collision by reducing a range of AIDs while transmitting a trigger frame. The AP can configure the range of the AIDs using a TIM bitmap transmitted in a beacon frame. Since the range of the AIDs is reduced to 6 to 10, the STAs 6 and 9 transmit the PS-poll only and the AP successfully receives the PS-poll frame. Subsequently, the AP additionally receives the PS-poll frame by configuring a different range of AIDs. According to one embodiment of the present invention, a range of STAs transmitting the PS-poll frame can be designated in advance in a beacon frame. For example, it may be able to use a DTIM count value. If a DTIM count corresponds to 0, AIDs 0 to 10 can be configured to transmit the PS-poll frame. If the DTIM count corresponds to 1, AIDs 11 to 20 can be configured to transmit the PS-poll frame. Or, a range of AIDs to transmit the PS-poll frame can be specified in every beacon frame. Or, when a beacon frame is transmitted using a TSF value, AIDs of STAs to transmit the PS-poll frame can be determined according to a time value.

The aforementioned collision resolution method of the STAs can also be applied to a buffer status report. In particular, when it is necessary for an STA to report a buffer status of the STA to an AP for MU UL-MIMO or MU UL-OFDMA, the AP transmits a trigger frame for an unspecified STA. The collision resolution method of the STAs can also be applied to a resource request for MU UL-MIMO/OFDMA.

Figure 27F:
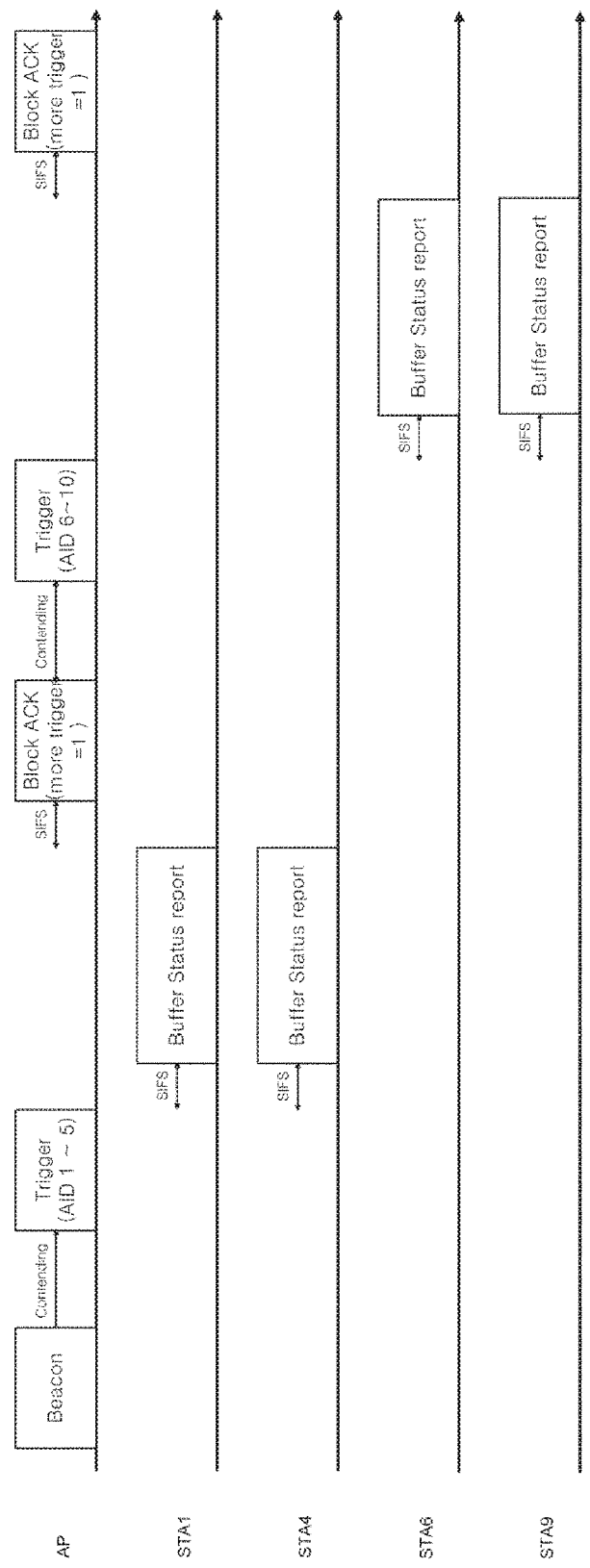
FIG. 27F is a diagram for a buffer status reporting procedure according to one embodiment of the present invention.

FIG. 27F is a diagram for a buffer status reporting procedure according to one embodiment of the present invention. Referring to FIG. 27F, an AP can designate a range of AIDs of STAs to transmit a buffer status request or a resource request via a trigger frame. Or, as mentioned in the foregoing description, the AP can designate STAs to transmit a buffer status request in a corresponding beacon interval using a DTIM count value. The AP can distribute STAs to transmit a buffer status report via modulo calculation.

If a trigger frame is transmitted several times in a single beacon interval and an STA to perform transmission is differently designated in every trigger frame, as shown in FIG. 27F, the AP can directly indicate a range of AIDs or indicate an order of an STA via a DTIM count value. For example, if a DTIM count corresponds to 1, 'modular 3' is calculated. An STA of which the remainder is 1 performs transmission after a first trigger frame and an STA of which the remainder is 2 performs transmission after a next trigger frame.

Figure 27G:
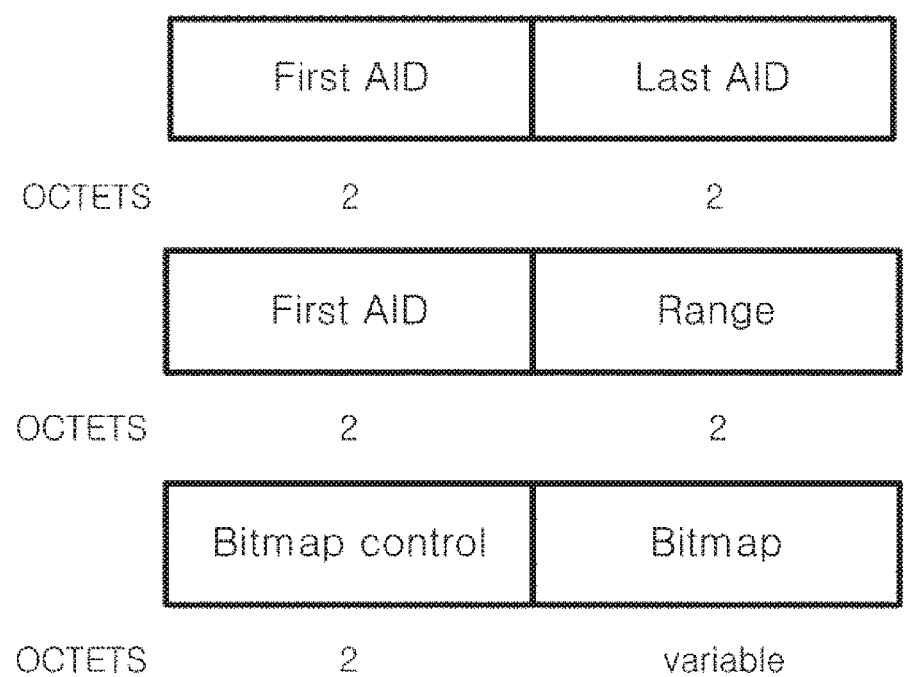
FIG. 27G is a diagram for methods of indicating AIDs of STAs according to one embodiment of the present invention.

FIG. 27G is a diagram for methods of indicating AIDs of STAs according to one embodiment of the present invention.

As a first method, an AP can indicate the start and the end of AIDs. For example, if the first AID corresponds to 10 and the last AID corresponds to 19, an STA including a range of AIDs ranging from 10 to 19 can perform transmission in a corresponding trigger frame.

As a second method, the AP can indicate the start and duration of AIDs. For example, if the first AID corresponds to 10 and a range corresponds to 10, an STA including AIDs ranging from 10 to 19 can perform transmission in a corresponding trigger frame.

As a third method, the AP can indicate AIDs using a bitmap. For example, the AP sets the start and length of a bitmap to 10 and 16, respectively, in Bitmap control. If such a bitmap as 1010101010101010 is transmitted, STAs of which an AID corresponds to 10, 12, 14, 16, 18, 20, 22, and 24 can perform transmission. The trigger frame, the probe request frame, and the probe response frame mentioned earlier in the embodiments for random access-based active scanning are explained in more detail in the following.

1. Trigger Frame for Active Scanning

Figure 28A:
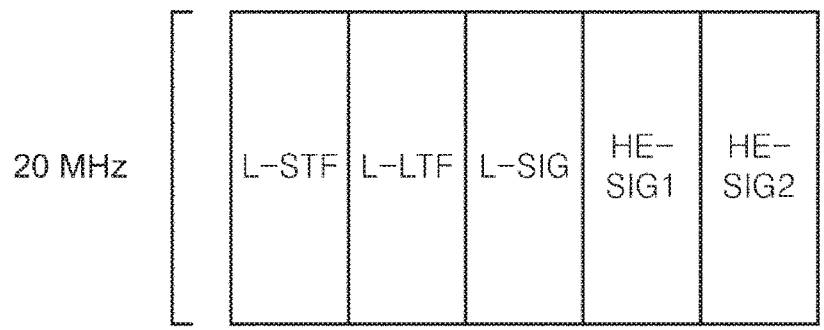
FIGS. 28A and 28B are diagrams for trigger frames according to embodiments of the present invention.
Figure 28B:
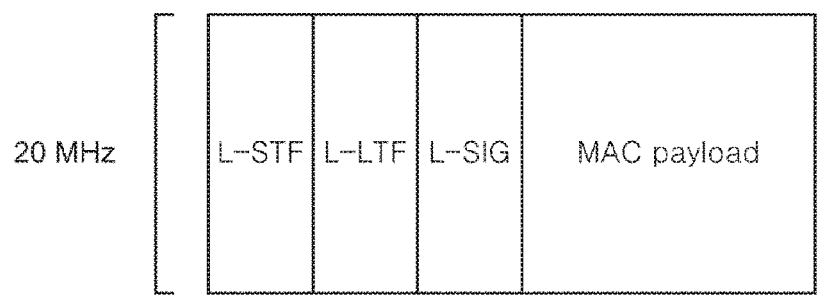

FIGS. 28A and 28B are diagrams for trigger frames according to embodiments of the present invention.

A trigger frame can include information described in the following.

Probing duration information: A length of probing duration. If this information is omitted, an STA can transmit a probe request frame at any time after a trigger frame is received. If this information is set to 0, it is able to block transmission and association of STAs located at far, thereby increasing network efficiency.

Trigger period: A period of transmitting a trigger frame. If an STA fails to perform transmission in a probing duration, this information shows waiting time for next transmission.

Trigger frame type: This information indicates a type of a transmitted trigger frame among a trigger frame transmitted to an unspecified STA for active scanning, a trigger frame for an association request, and a trigger frame for UL MU-MIMO/UL MU-OFDMA.

In FIGS. 28A and 28B, (i) L-STF, L-LTF, and L-SIG are the same with the legacy scheme. Since an 11ax STA near an AP and a legacy STA are able to perform decoding after a corresponding field is received, TXOP of a trigger frame can be protected. (ii) Information for decoding HE-SIG2 is included in HE-SIG1. In case of FIG. 28B, this information can be omitted. (iii) Probing duration information, a trigger period, and trigger frame type information are included in HE-SIG2 or MAC Payload.

A trigger frame can be replaced with a beacon frame. In particular, after STAs receive a beacon frame, if it is necessary to have additional information or express the intention for association, the method mentioned earlier in FIG. 27 can be used. For efficiency, information can be periodically included (e.g., the information can be included when a beacon frame is transmitted three times) without including the information in all beacon frames.

Or, the AP can transmit information on a trigger frame via a beacon frame. The AP can transmit a period of transmitting a trigger frame and timing of transmitting a trigger frame via a beacon frame.

2. Probe Request Frame

Figure 29:
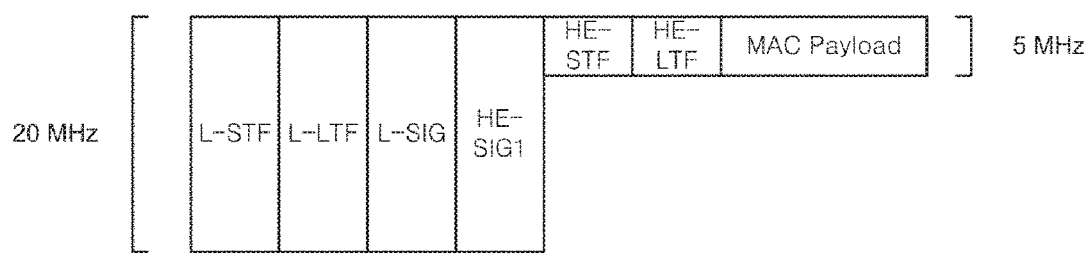
FIG. 29 is a diagram for a probe request frame according to one embodiment of the present invention.

FIG. 29 is a diagram for a probe request frame according to one embodiment of the present invention.

A probe request frame can include association intention information. If an STA is already aware of information on a network (e.g., in case of receiving a beacon frame), it is able to make a request for association before a probe response. Having received the probe request frame including the association intention, an AP omits transmission of the probe response transmitted to the STA and transmits a trigger frame for an association request frame.

Referring to FIG. 29, (i) L-STF, L-LTF, and L-SIG include information identical to legacy information in a probe request frame. Since an 11ax STA near an AP and a legacy STA are able to perform decoding after a corresponding field is received, TXOP of a probe request frame can be protected. For example, after STA2, STA3, and STA4 near STA1 decode a corresponding field in FIG. 26, it may be able to protect TXOP until ACK is received from an AP. (ii) Information for decoding HE-STF, HE-LTF, and MAC payload is included in HE-SIG1. Information obtained from a trigger frame, BSS coloring, or bandwidth information can also be included in the HE-SIG1. (iii) HE-STF and HE-LTF are used for estimating a channel for MAC Payload decoding. (iv) MAC Payload includes information of a probe request frame.

Meanwhile, an STA may directly transmit an association request frame instead of a probe request frame.

If the method mentioned earlier in FIG. 27D is used, an STA randomly determines sub channels of HE-STF, HE-LTF, and MAC Payload. In FIG. 29, assume that an STA randomly selects a sub channel located at the top.

3. Probe Response Frame

Figure 30:
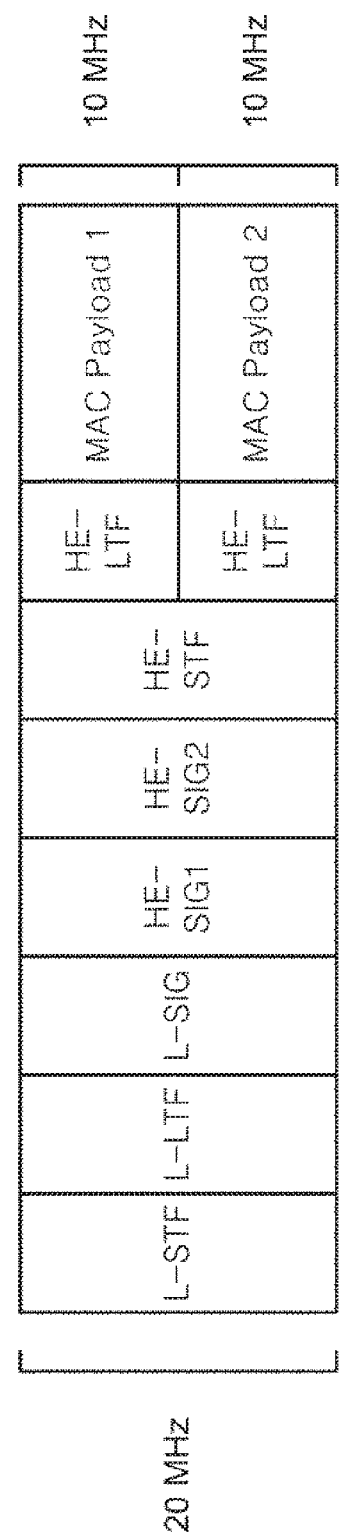
FIG. 30 is a diagram for a probe response frame according to one embodiment of the present invention.

FIG. 30 is a diagram for a probe response frame according to one embodiment of the present invention.

A probe response frame can include information described in the following.

pre-AID: An AP assigns a pre-AID to each of STAs, which has transmitted a probe request frame to the AP. The pre-AID can make a reservation for a specific duration in advance. The AP assigns a currently not used AID to an STA and may be then able to additionally inform that STA that the assigned AID corresponds to a pre-AID. Depending on an embodiment, it may be able to transmit a pre-AID via ACK in response to a probe request frame. The terminology pre-AID can also be referred to as a temporary AID.

pre-AID flag: Information for informing each STA of whether or not an assigned AID corresponds to a pre-AID. Depending on an embodiment, the pre-AID flag can be transmitted via ACK in response to a probe request frame.

Referring to FIG. 30, (i) L-STF, L-LTF, and L-SIG are configured in a manner of being identical to legacy information. Since an 11ax STA near an AP and a legacy STA are able to perform decoding after a corresponding field is received, TXOP of a probe response frame can be protected. (ii) Information for decoding HE-SIG2, HE-STF, HE-LTF, and MAC payload is included in HE-SIG1. (iii) HE-SIG2 indicates resource allocation information of a current frame. (iv) HE-STF and HE-LTF are used for estimating a channel for MAC Payload decoding. (v) MAC Payload includes information of a probe response frame. MAC payload 1 and MAC payload 2 are transmitted to an STA1 and an STA2, respectively.

Meanwhile, a trigger frame for an association request frame can be directly transmitted instead of a probe response frame.

If an STA clearly shows an association intention via a probe request frame, an AP can omit transmission of a legacy probe response frame.

Random Access-Based Association Procedure

In the following, a method for an 11ax STA to perform association in remote is proposed. For example, a method for an STA1 and an AP to perform association using a narrow band (e.g., 5 MHz) is proposed.

Figure 31:
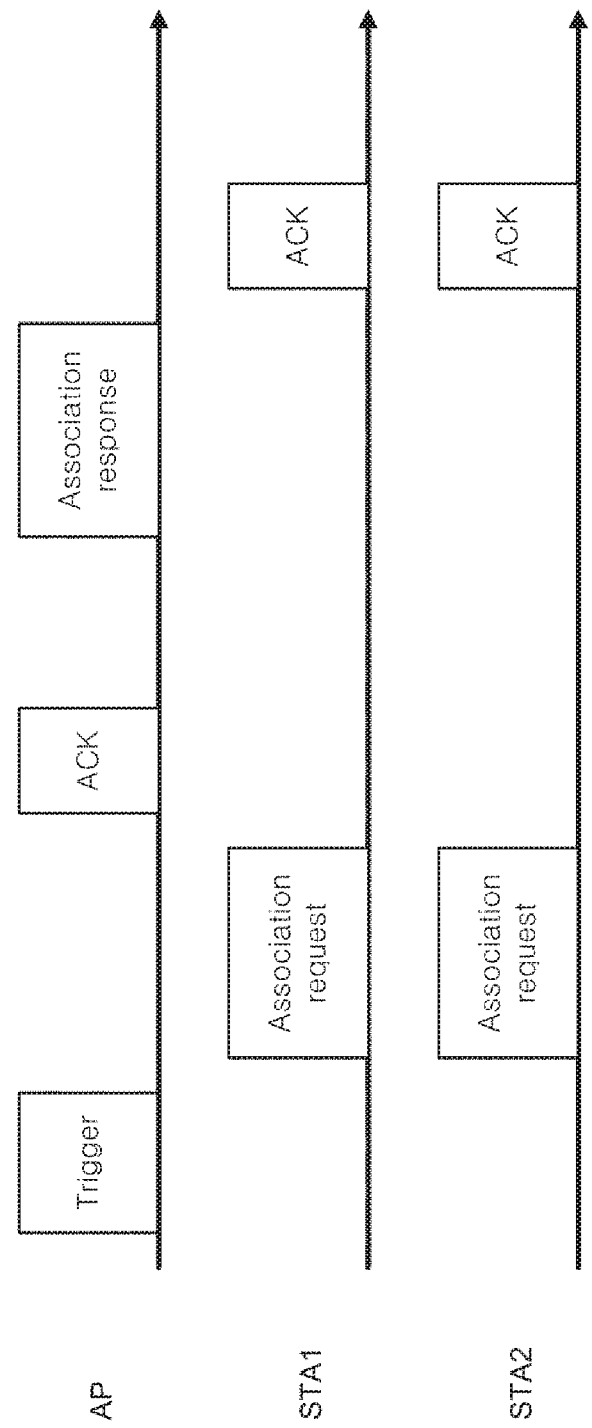
FIG. 31 is a diagram for an association procedure according to one embodiment of the present invention.

FIG. 31 is a diagram for an association procedure according to one embodiment of the present invention.

Assume that an AP assigns a pre-AID to STAs intending to perform association via the aforementioned active scanning procedure. A trigger frame includes information on resources allocated to each of the STAs using a pre-AID. Having received the trigger frame, each STA transmits an association request frame to the AP via an allocated resource using MU-OFDMA technique. Subsequently, the AP informs the STAs of a result of the association request by transmitting an association response to the STAs.

Or, an STA can transmit an association request frame to an SU without a pre-AID. In this case, since the STA is already aware of information on a network via passive scanning, it is not necessary for the STA to receive a pre-AID via the aforementioned active scanning.

Frames capable of being used for an association procedure according to one embodiment of the present invention are explained in the following.

1. Trigger Frame for Association Procedure

A trigger frame can include information described in the following.

Resource allocation information: An AP allocates a resource for MU-OFDMA according to each pre-AID and transmits resource allocation information to an STA. Or, the AP may transmit resource allocation information and information on a pre-AID corresponding to the resource allocation information together.

Trigger frame type: This information indicates a type of a transmitted trigger frame among a trigger frame transmitted to an unspecified STA for active scanning, a trigger frame for an association request, and a trigger frame for UL MU-MIMO/UL MU-OFDMA. And, the trigger frame type may indicate a trigger frame for a GAS request or an authentication request. Or, the trigger frame type may indicate a trigger frame for transmission of an STA to which AID is assigned or a trigger frame for transmission of an STA to which AID is not assigned.

(1) If an AP allocates a resource for an unassociated STA, the unassociated STA can perform random access only in the allocated resource and random access of an associated STA may be prohibited. An indicator indicating the resource for the unassociated STA only can be additionally transmitted via the resource allocation information.

(2) If an AP allocates a resource for an unassociated STA, in order to more efficiently utilize the resource, it may be able to configure both the unassociated STA and an associated STA to perform random access. A pre-AID (e.g., X bit, where X is a random positive number) can be transmitted for the unassociated STA. A method of transmitting the pre-AID is explained in more detail in the following.

Figure 32A:
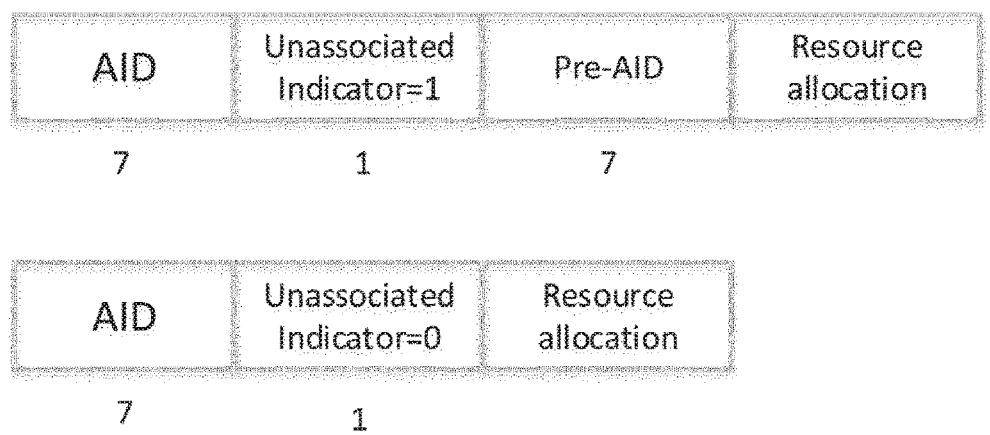
FIGS. 32A and 32B are diagrams for a pre-AID transmission format according to embodiments of the present invention.
Figure 32B:
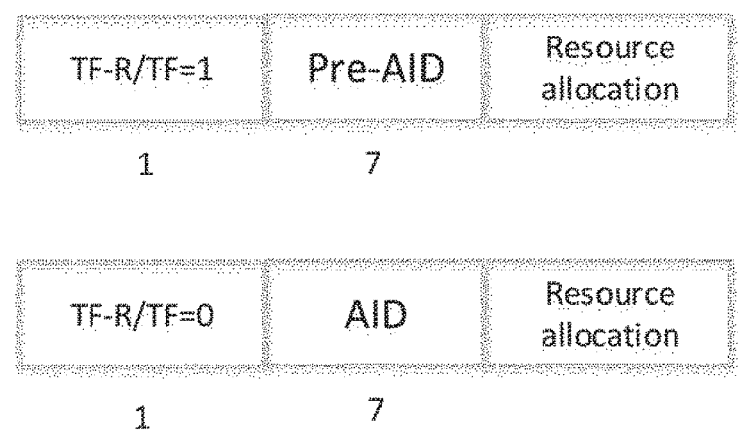

(2)-i. pre-AID transmission method 1: It may be able to indicate resource allocation for random access using a broadcast AID (e.g., All zero; Y bits, where Y is a random positive number). In this case, it may be able to additionally transmit a pre-AID for an unassociated STA using a format depicted in FIG. 32A. In case of transmitting resource allocation information including AID instead of the broadcast AID (e.g., All zero), an unassociated indicator and a pre-AID field can be omitted. For example, if the broadcast AID (e.g., All zero) is transmitted to an AID field, having received the broadcast AID, the STA reads an unassociated indicator field. If the unassociated indicator field corresponds to 1, the STA is able to know that a next field corresponds to a pre-AID field. As mentioned in the foregoing description, having received the resource allocation information, the unassociated STA and the associated STA are able to know that random access is available via the allocated resource.

(2)-ii. pre-AID transmission method 2: It may be able to indicate whether it is resource allocation for a scheduled access or resource allocation for a random access using an indicator indicating TF/TF-R. For example, it may be able to transmit trigger information for an associated STA and trigger information for an unassociated STA. In case of TF-R, a pre-AID (X bits, where X is a random positive number) value is transmitted. In case of TF, an AID (X bits, where X is a random positive number) value can be transmitted. For example, if TF-R/TF corresponds to 1, assume that it indicates TF-R. Having received the TF-R/TF=1, the unassociated STA and the associated STA can perform random access (transmits a UL frame) via an allocated resource. On the contrary, having received TF-R/TF=0, the unassociated STA and the associated STA can perform scheduled access via the allocated resource. If an AID value transmitted later is matched with a (pre-)AID, it may be able to transmit a UL frame via the allocated resource.

In the following, operations of the associated STA and the unassociated STA, which have received (pre-)AID information, resource allocation information, and/or information on whether it is TF-R or TF, are explained, respectively.

(2)-iii. Operation of associated STA

Having obtained the aforementioned information, an associated STA (or an STA obtained pre-AID) can transmit a UL frame by randomly accessing an allocated resource.

(2)-iii-1). Associated STA operation method 1: An associated STA (or an STA obtained pre-AID) can maintain a previous pre-AID allocated to the associated STA. Having properly received a UL frame transmitted from the associated STA, an AP can transmit ACK (e.g., M-BA, OFDMA ACK, etc.) to an STA using the previously allocated pre-AID. In particular, the associated STA can ignore the pre-AID transmitted together with resource allocation information in a trigger frame.

(2)-iii-2). Associated STA operation method 2: An associated STA (or an STA obtained pre-AID) can receive ACK information from an AP using the pre-AID mapped to a resource transmitted by the associated STA in UL. In particular, having properly received a UL frame from the associated STA, the AP can transmit ACK (e.g., M-BA, OFDMA ACK, etc.) to an STA using a pre-AID mapped to a resource in which a UL frame is transmitted. Having received the ACK (e.g., M-BA, OFDMA ACK, etc.), the STA can update a pre-AID of the STA using the pre-AID mapped to the resource in which the UL frame is transmitted. In this case, in order to prevent a collision of the pre-AID, MAC address can be additionally transmitted to M-BA (multi-STA Block Ack). The STA can precisely receive ACK information transmitted to the STA using the MAC address of the M-BA.

(2)-iii-3). Associated STA operation method 3: Having properly received a UL frame from an associated STA, an AP can transmit ACK information via ACK (M-BA, OFDMA ACK, etc.) using a pre-AID value mapped to a resource in which a UL frame is transmitted by an STA or a pre-AID value preassigned to the STA. The STA can receive the ACK (M-BA, OFDMA ACK, etc.) transmitted by the AP using a pre-AID value mapped to the resource in which the UL frame is transmitted by the STA or a preassigned pre-AID value. Subsequently, the STA can update the pre-AID value of the STA using the pre-AID value transmitted from the ACK (M-BA, OFDMA ACK, etc.). In this case, in order to prevent a collision of the pre-AID, MAC address can be additionally transmitted to M-BA (multi-STA Block Ack). The STA can precisely receive ACK information transmitted to the STA using the MAC address of the M-BA.

(2)-iii-4). Associated STA operation method 4: An associated STA (or an STA obtained pre-AID) can update a pre-AID of the associated STA using a pre-AID mapped to a resource in which a UL frame is transmitted. Having properly received the UL frame from the associated STA, an AP can transmit ACK (M-BA, OFDMA ACK, etc.) using the pre-AID updated by the STA. In this case, in order to prevent a collision of the pre-AID, MAC address can be additionally transmitted to M-BA (multi-STA Block Ack). The STA can precisely receive ACK information transmitted to the STA using the MAC address of the M-BA.

(2)-iv. Operation of unassociated STA

Having obtained the aforementioned information, an unassociated STA (or an STA failed to obtain a pre-AID) can transmit a UL frame by randomly accessing an allocated resource. Having properly received the UL frame from the unassociated STA, an AP can transmit ACK ((M-BA, OFDMA ACK, etc.) using a pre-AID value mapped to a resource used for transmitting the UL frame.

In this case, in order to prevent a collision of the pre-AID, MAC address can be additionally transmitted to M-BA.

Figure 33A:
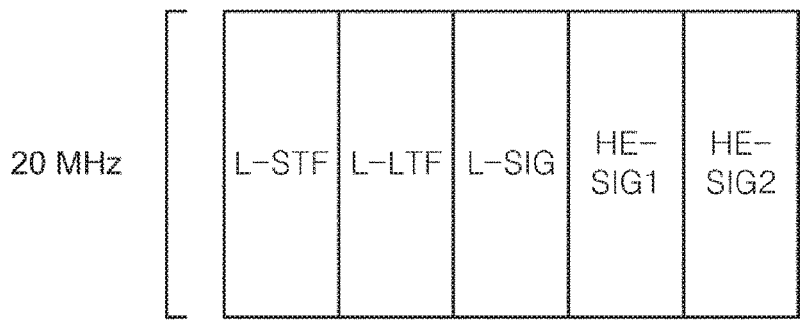
FIGS. 33A and 33B are diagrams for a PPDU format of a trigger frame according to one embodiment of the present invention.
Figure 33B:
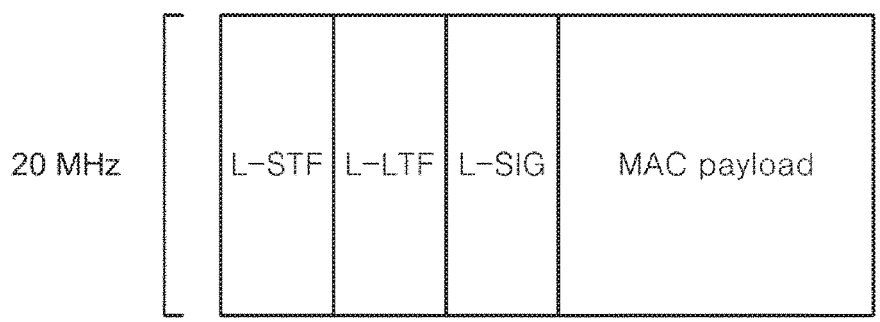

FIGS. 33A and 33B are diagrams for a PPDU format of a trigger frame according to one embodiment of the present invention. In FIGS. 33A and 33B, L-STF, L-LTF, and L-SIG are configured in a manner of being identical to legacy information. Since an 11ax STA near an AP and a legacy STA are able to perform decoding after a corresponding field is received, TXOP of a trigger frame can be protected. Information for decoding HE-SIG2 is included in HE-SIG1. MAC Payload or HE-SIG2 includes resource allocation information, trigger frame type information, and the like.

2. Association Request Frame

Figure 34:
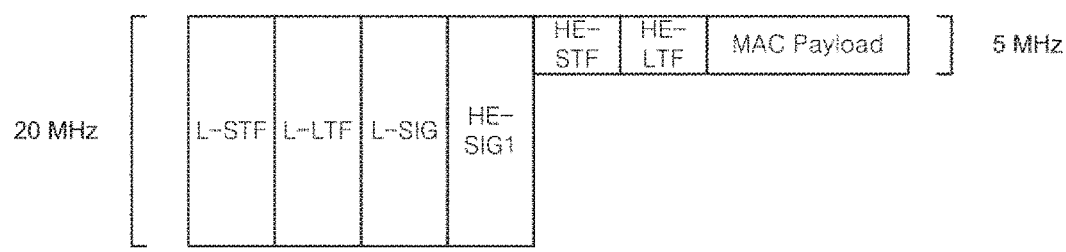
FIG. 34 is a diagram for a PPDU format of an association request frame.

Information of an association request frame can be configured in a manner of being identical to legacy information. FIG. 34 is a diagram for a PPDU format of an association request frame.

In FIG. 34, L-STF, L-LTF, and L-SIG are configured in a manner of being identical to legacy information. Since an 11ax STA near an AP and a legacy STA are able to perform decoding after a corresponding field is received, TXOP of the association request frame can be protected. Information for decoding HE-SIG2 is included in HE-SIG1. MAC Payload includes the information of the association request frame.

3. ACK/Block ACK Frame

An AP can transmit ACK to a STA in response to an association request frame based on DL MU OFDMA or via broadcasting of M-BA. For example, an RA (receiver address) field of the M-BA can be configured by a broadcasting AID value. The broadcasting AID may correspond to a predetermined value.

Figure 35:
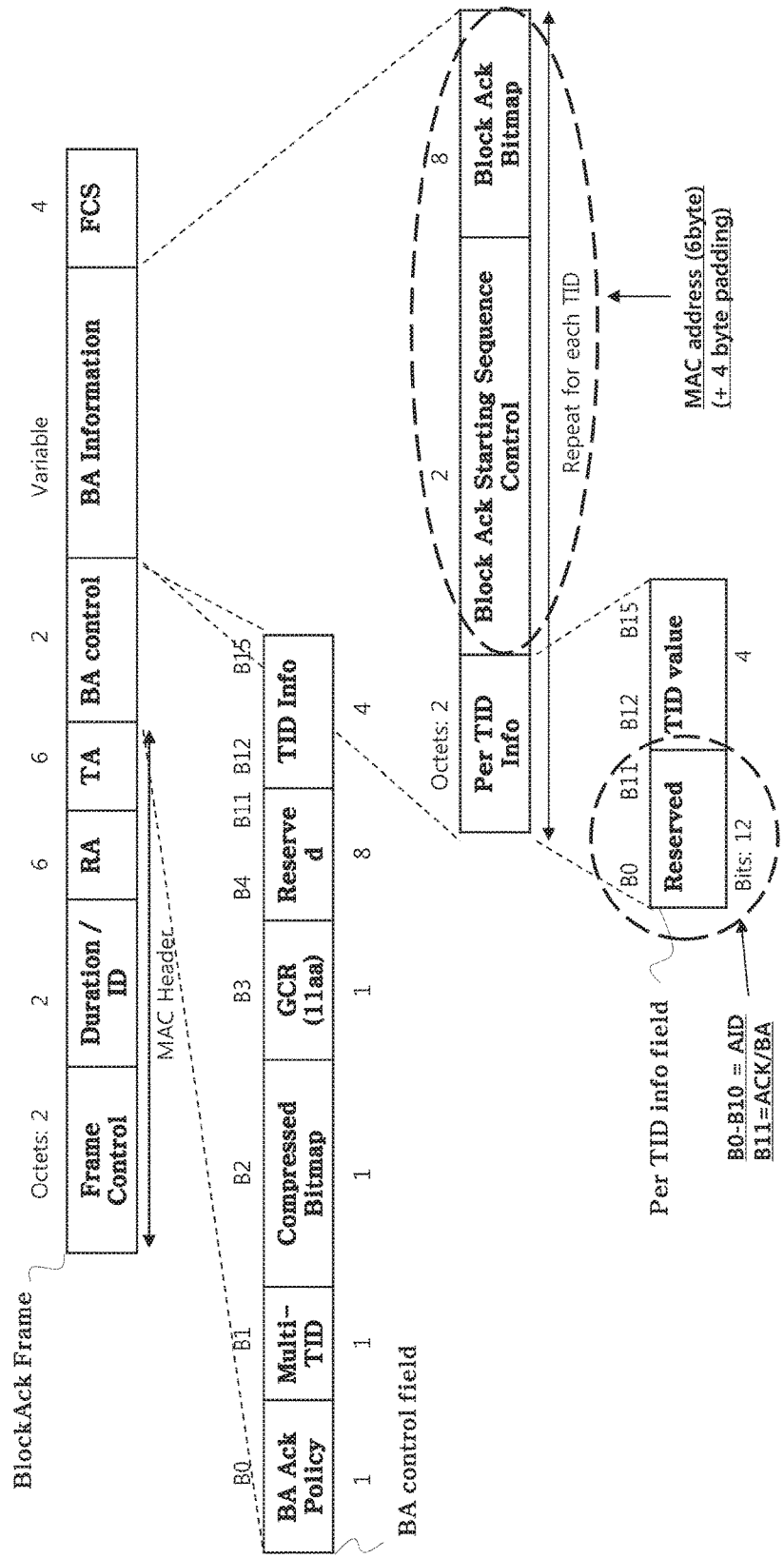
FIG. 35 is a diagram for an M-BA frame according to one embodiment of the present invention.

(1) Method of Transmitting MAC Address Via SSC (Starting Sequence Control) and BA (Block ACK) Bitmap When an AP transmits ACK to an STA via broadcasting of M-BA in response to an association request frame, as shown in FIG. 35, a pre-AID of the STA is set to Per TID (traffic identifier) (one or more bit(s) among 'B0' to 'B10' of Info field (hereinafter, B0-B10)) of the M-BA and a value indicating BA is set to B11. By doing so, it is able to set a TA (transmitter address) value (i.e., a MAC address value of the STA) of the association request frame, which is successfully received by the AP, to BA SSC (Block ACK Starting Sequence Control) field and a Block ACK Bitmap field. In this case, padding can be performed on other bits except the MAC address value (6 bytes) by '0' or '1'.

Having transmitted the association request frame, the STA receives the M-BA. If B0-B10 of the BA information of the M-BA is configured by a pre-AID of the STA, the STA obtains MAC address in a manner of excluding padding bits from the BA SCC of the BA information and the BA Bitmap field. If the obtained MAC address is matched with MAC address of the STA, the STA is able to know that the AP has successfully received the association request frame transmitted by the STA. On the contrary, if the obtained MAC address is not matched with the MAC address of the STA, the STA is able to know that the AP has failed to receive the association request frame transmitted by the STA. In this case, the STA can transmit the association request frame again.

And, the AP can set the MAC address to the SSC and/or the BA bitmap only when the TID value or the SSC is configured by a predefined value by configuring the TID value or the SSC by the predefined value (e.g., all zero or one) of the BA information. In particular, the AP configures the TID value or the SSC by the predefined value to inform the STA of whether or not the BA corresponds to a BA for the STA which has transmitted the association request frame. If the TID value is configured by the predefined value, SSC field is omitted and the MAC address of the STA can be transmitted via the BA bitmap.

Having received the TID value or the SSC configured by the predefined value, the STA is able to know that the MAC address is transmitted from the BA bitmap or the BA information field. In the present invention, although the BA bitmap or the BA information field is explained, this is an embodiment only. A new field for transmitting the MAC address can be newly defined. For example, when the TID value is configured by a predefined value (e.g., 1), it is able to define as 6-byte MAC address is transmitted to the BA information field. By doing so, the STA is able to know that 6-byte MAC address is transmitted. If a received MAC address is different from MAC address of the STA, the STA is able to know that the AP has failed to properly receive the association request frame of the STA. In this case, the STA can transmit the association request frame of the STA again.

For example, in FIG. 31, assume that the AP has transmitted MU-OFDMA resource allocation respectively corresponding to a pre-AID of the STAs 1 and 2 to the STAs 1 and 2 via a trigger frame, both the STA1 and the STA2 have transmitted an association request frame to the AP using a sub channel assigned for pre-AID=10, and the AP has detected the association request frame of the STA 1 only due to power of the STA 1 stronger than the power of the STA 2. In this case, both the STA 1 and the STA 2 can receive M-BA from the AP by considering a pre-AID as 10. In order to inform the STA 1 that the association request frame transmitted by the STA 1 is successfully received, the AP set B0-B10 of the Per TID field of the M-BA to pre-AID=10, sets ACK/BA of B11 to BA, and transmits a TA value transmitted by the STA 1 in the association request frame (i.e., MAC address of the STA 1) via the BA SSC field and the BA Bitmap field. The STA 1 and the STA 2 receive ACK information corresponding to the pre-AID=10 and receives MAC address information transmitted via the BA SSC field and the BA Bitmap field. The STA 1 and the STA 2 compare the MAC address received from the AP with MAC address of its own. Having received the MAC address of the STA 1, the STA 1 is able to know that the AP has successfully received the association request frame transmitted by the STA 1. On the contrary, the STA 2 is able to know that the AP has failed to receive the association request frame transmitted by the STA 2. The STA 2 is able to retransmit the association request frame to the AP without waiting for an association response frame.

(2) Method of Transmitting Pre-AID Via SSC and Transmitting MAC Address Via BA Bitmap According to a different embodiment of the present invention, when an AP sets a specific value (e.g., broadcast AID value) to B0-B10 of Per TID Infor field of M-BA and sets BA to B11, the AP is able to transmit/assign a pre-AID via a BA SCC field and transmit a TA value of an association request frame properly received by the AP (i.e., a MAC address value of an STA which have transmitted the association request frame). In this case, other bits except the MAC address value (i.e., 6 octets) can be padded with '0' or '1'. And, it may be able to notify that the MAC address is transmitted by configuring a TID value by a specific value.

Having transmitted the association request frame, the STA obtains BA SSC and Block Ack Bitmap field of which B0-B10 is configured by a specific value (e.g., broadcast AID value) and/or TID is configured by a specific value among BA information via M-BA. The STA excludes information corresponding to padding from the BA SSC and the Block Ack Bitmap field to obtain a pre-AID and MAC address. If the obtained MAC address is identical to MAC address of the STA, the STA is able to know that the AP has successfully received the association request frame transmitted by the STA and a temporary ID is assigned to the STA. On the contrary, if the obtained MAC address is not matched with the MAC address of the STA, the STA is able to know that the AP has failed to receive the association request frame of the STA. In this case, the STA can retransmit the association request frame to the AP.

The AP can signal the STA on whether or not the AP rejects association by configuring the TID value, the SSC, the BA bitmap, etc. by a specific value. The association rejection can be determined based on capability of an association request frame, capability or a situation of the AP, or the like. Or, a table to which information on whether or not association is rejected, a time interval capable of performing association again, a reason for the association rejection and the like are mapped can be defined in advance.

Having received an association response frame, the STA is able to know that the AP has successfully received the association request frame of the STA, when the association response frame includes a pre-AID (a pre-AID corresponding to a sub channel on which the association request frame of the STA is transmitted) assigned to the STA and the MAC address transmitted after the pre-AID is matched with the MAC address of the STA. The STA is able to know whether or not the AP rejects the association and, if the association is rejected, information on timing at which the association is to be performed again via a value of the TID value. This can be identically applied to an SU Block Ack frame using EDCA or an OFDMA Block Ack frame through a reserved bit of the BA Control field, TID_INFO, or a BA Information field, or the like.

For example, assume that '111' is defined as the AP rejects association and association is performed in 10 ms. In order for the AP to receive an association request frame from an STA1, reject the association of the STA, and make the STA1 perform association in 10 ms, the AP sets a value of the TID Value of the M-BA to '111' and transmits the value to the STA1.

For clarity, an example of the association request/response procedure has been explained, by which the present may be non-limited. The present embodiment can also be applied to a probe request/response procedure, a GAS request/response procedure, and an authentication request/response.

The AP distinguishes a trigger frame for random access of an STA to which an AID is assigned from a trigger frame for random access of an STA to which an AID is not assigned based on a trigger frame type to allocate UL transmission resource allocation information and a pre-AID of an STA. Or, the AP may be able to assign a pre-AID using M-BA.

The STA receives information on a trigger frame for random access of an STA to which an AID is not assigned and may be then able to transmit at least one of a probe request, a GAS request, an authentication request, and an association request via a resource region allocated for the random access. Having assigned the AID from the AP, the STA receives information on a trigger frame for random access of an STA to which the AID is assigned, (i) transmits at least one of a probe request, a GAS request, an authentication request, and an association request via a resource region allocated for the random access, (ii) informs the AP that the AID is already assigned to the STA via (i) and does not receive a new AID, or (iii) receives a new AID.

And, the AP may use the aforementioned method to change the pre-AID of the STA, which have transmitted the association request frame. If the STA receives the pre-AID together with the MAC address information of the STA, the STA is able to know that the pre-AID value, which is transmitted together with the MAC address information of the STA, is assigned again by the AP. In particular, the AP informs the STA that the frame of the STA is successfully received via ACK. If the pre-AID of the STA is collided with an AID or a pre-AID of a different STA, the AP transmits MAC address information and a new pre-AID to the STA. The STA can obtain a new pre-AID using an AID field in the STA Info matched with the MAC address of the STA.

(3) Method for STA to Select Pre-AID.

According to a further different embodiment, an unassociated STA randomly selects a pre-AID and transmits an association request frame to an AP while the AP does not assign a pre-AID for the unassociated STA. In this case, the association request frame can be transmitted via a resource allocated by a trigger frame (e.g., a trigger frame for random access or a trigger frame for scheduled transmission).

And, the AP can signal a pre-AID set capable of selecting a pre-AID by the unassociated STA to the unassociated STA via a beacon (prove response, or the like) or a trigger frame. The unassociated STA can select a pre-AID from the pre-AID set.

Or, a MAC address of the unassociated STA can be used as a pre-AID. For example, LSB N bits (N is a random positive integer) of the MAC address of the unassociated STA can be configured to be used as a pre-AID.

Having received the association request frame from the unassociated STA, the AP determines whether or not the unassociated STA uses a pre-AID based on the MAC address (e.g., LSB 11 bits of the MAC address). If a collision occurs on the pre-AID, the AP can transmit a new pre-AID to the STA via M-BA/BA/ACK. The pre-AID based on the MAC address can be used under conditions described in the following. (i) when the unassociated STA transmits the association request frame using a HE PPDU format, (ii) when it is informed that the STA has MU capability via a HE Capabilities field transmitted in a (re)association request frame or a probe request frame or when it is informed that the STA has MU capability via a MU capability-related field defined in a VHT Capabilities Information element, or (iii) when the STA requests pre-AID assignment via a MAC Header. In this case, in order to request the pre-AID assignment, it may be able to use a Frame Control field of the MAC Header, reserved bits such as HT control, HE control, or the like.

For example, if it is predefined that the unassociated STA and the AP use the LSB 11 bits of the MAC address of the STA as an initial pre-AID, the unassociated STA can transmit the association request frame. In this case, assume that the LSB 11 bits of the MAC address of the STA corresponds to '11101100110'.

Having received the association request frame, the AP is able to check the MAC address of the STA using TX address of the association request frame transmitted by the unassociated STA and consider the LSB 11 bits of the MAC address '11101100110' as the pre-AID value of the unassociated STA.

If the MAC address-based pre-AID value of the unassociated STA is collided with a pre-AID value of a different unassociated STA or an AID value of an associated STA, the AP can assign a new pre-AID to the unassociated STA by transmitting 'new pre-AID+BA indication+predetermined TID value (e.g., all 1's, etc.)+MAC address value of the STA' capable of being used in the M-BA to the unassociated STA. If a predetermined TID value is received, the MAC address of the STA is received after the TID value, and a pre-AID value received prior to the TID value is different from the MAC address-based pre-AID value, the STA is able to know that the AP has assigned a new pre-AID value. If the unassociated STA, which have received the M-BA frame from the AP, receives a predetermined TID value but the MAC address value transmitted after the TID is not matched with the MAC address of the unassociated STA, the STA is able to know that the AP has failed to receive the association request frame transmitted by the STA. In this case, the unassociated STA can retransmit the association request frame to the AP.

If the MAC address-based pre-AID value of the unassociated STA is not collided with a pre-AID value of a different unassociated STA or an AID value of an associated STA, the AP can signal the STA that a pre-AID value requested by the unassociated STA is available by transmitting 'MAC address-based pre-AID+BA indication+predetermined TID value (e.g., all 1's, etc.)+MAC address value of the STA' to the unassociated STA via M-BA. If a predetermined TID value is received, the MAC address of the STA is received after the TID value, and a pre-AID value received prior to the TID value is identical to the MAC address-based pre-AID value, the STA is able to know that the MAC address-based pre-AID is available. If the unassociated STA, which have received the M-BA frame from the AP, receives a predetermined TID value but the MAC address value transmitted after the TID is not matched with the MAC address of the unassociated STA, the STA is able to know that the AP has failed to receive the association request frame transmitted by the STA. In this case, the unassociated STA can retransmit the association request frame to the AP. Or, the AP can signal the STA that the MAC address-based pre-AID is available by transmitting 'MAC-address-based pre-AID (e.g., LSB 11 bits of MAC address)+ACK indication+predetermined TID value (e.g., all 1's, etc.)' to the STA via M-BA.

The aforementioned embodiments for the pre-AID assignment can be mainly classified into a centralized scheme and a distributed scheme.

According to embodiments of the centralized scheme, the AP assigns a pre-AID to STAs. According to one embodiment of the centralized scheme, the pre-AID can be assigned according to a resource for UL OFDMA-based random access. According to an embodiment that a trigger frame is used for assigning the pre-AID, the AP signals a mapping relationship between the pre-AID and a resource to an STA via the trigger frame. The AP confirms the pre-AID via DL OFDMA ACK. According to the present embodiment, a random access resource can be reserved only when the random access resource is used for the usage of pre-AID assignment.

According to a different embodiment of the centralized scheme, a pre-AID can be assigned via M-BA. An STA transmits an association request frame to the AP using a UL OFDMA-based random access scheme and the AP assigns a pre-AID to the STA via the M-BA. If M-BA frame does not include MAC address, a collision may occur between STAs.

According to one embodiment of the distributed scheme, an STA autonomously and randomly determines a pre-AID and transmits a frame including the determined pre-AID to the AP. The AP can confirm the pre-AID of the STA via MU ACK or the like. In order to avoid a collision between the pre-AID of the STA and AID of a different STA, additional 1-bit can be used for HE-SIG 2 (or HE-SIG B). and, in order to prevent a collision of the pre-AID, the AP may consider a method of transmitting both MAC address of the STA and the pre-AID of the STA in M-BA frame.

According to an embodiment of the centralized scheme, if a TID value of M-BA is configured by a predetermined value and ACK/BA corresponds to 0, it is able to configure an STA to discover MAC address of the STA in the M-BA. In particular, the AP can assign a pre-AID via the M-BA.

According to an embodiment of the distributed scheme, if a TID value of M-BA is configured by a predetermined value and ACK/BA corresponds to 0, it is also able to configure an STA to discover MAC address of the STA in the M-BA. If the MAC address of the STA is discovered in the M-BA, it indicates that the AP has successfully received a random access-based request. On the contrary, if the M-BA does not include the MAC address of the STA, it indicates that the AP has failed to successfully receive the random access-based request of the STA.

4. Association Response Frame

Figure 36:
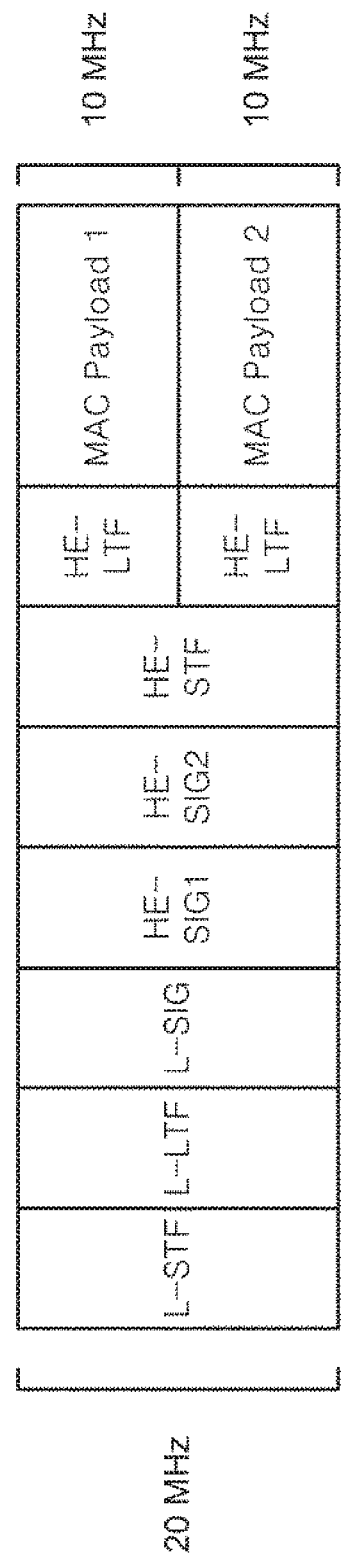
FIG. 36 is a diagram for a PPDU format of an association response frame according to one embodiment of the present invention.

FIG. 36 is a diagram for a PPDU format of an association response frame according to one embodiment of the present invention.

In FIG. 36, L-STF, L-LTF, and L-SIG can be configured in a manner of being identical to legacy information. Since an 11ax STA near an AP and a legacy STA are able to perform decoding after a corresponding field is received, TXOP of an association response frame can be protected. Information for decoding HE-SIG2, HE-STF, HE-LTF, and MAC payload is included in HE-SIG1. HE-SIG2 indicates resource allocation information of a current frame. HE-STF and HE-LTF are used for estimating a channel for MAC Payload decoding. MAC Payload includes information of an association response frame. MAC payload 1 and MAC payload 2 are transmitted to an STA1 and an STA2, respectively.

Random Access of Multi-User

Figure 37:
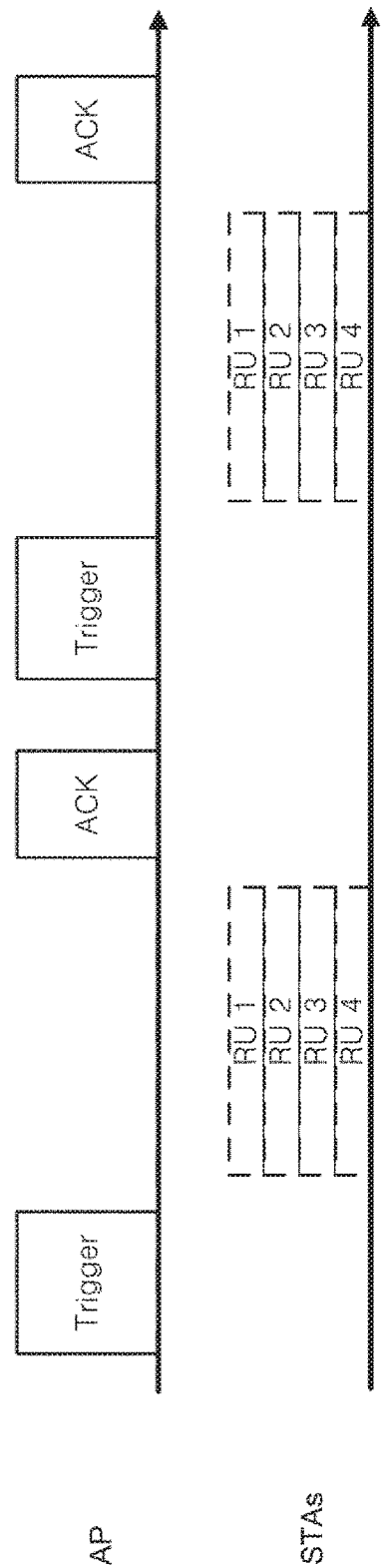
FIGS. 37 and 38 are diagrams for a random access method of multiple users according to embodiments of the present invention.
Figure 38:
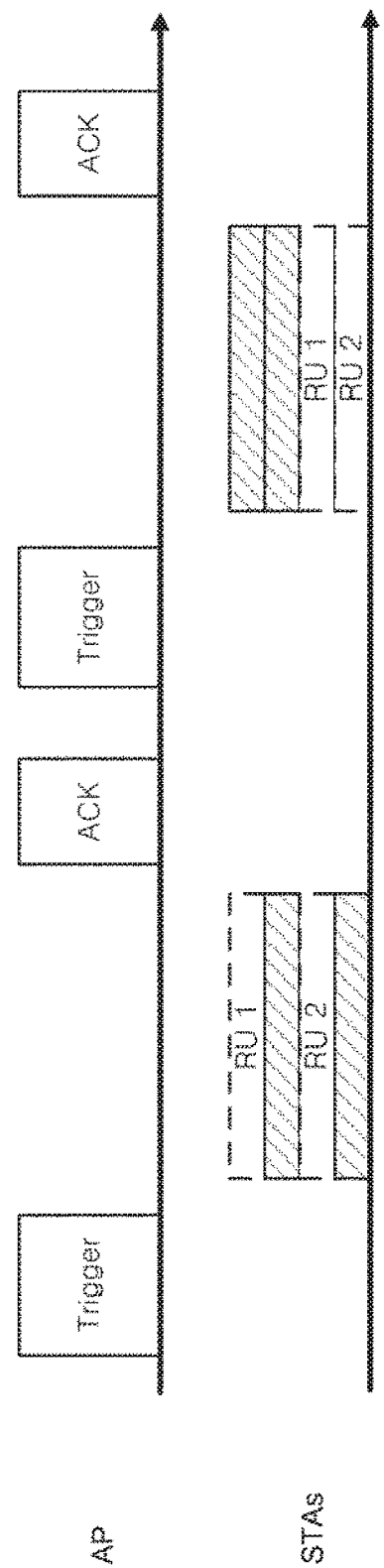

FIGS. 37 and 38 are diagrams for a random access method of multiple users according to embodiments of the present invention.

Referring to FIG. 37, an STA receives a trigger frame, selects a random value based on CWmin (minimum contention window) defined in the trigger frame, and enters into competition with a different STA via backoff. In this case, the random value is referred to as a backoff count and the backoff count is reduced by 1 in every frequency unit (RU (resource unit)) or a trigger frame. For example, assume that CWmin=7 is indicated by a trigger frame. Having received the trigger frame, an STA selects an integer value from among CW 0 to 7. If it is assumed that the STA has selected CW 5, the STA can perform transmission using one of methods described in the following. (i) The STA receives a fifth trigger frame, randomly selects a frequency unit (RU), and transmits the selected frequency unit. (ii) The STA performs transmission at the fifth frequency unit (RU).

If the transmission fails, the STA configures the CW value to be doubled. If the CW value becomes identical to CWmax, the STA stops increasing the CW.

The trigger frame includes information on a frequency unit capable of being transmitted by the STA. The AP can allocate the whole of the frequency units or a part of the frequency units to an unspecified STA depending on a situation. FIG. 38 shows a case that a part of the frequency units is allocated only.

Embodiments of the present invention can be applied to transmission of a probe request frame, an authentication request frame, an association request frame, a buffer status reporting frame, or a PS-poll frame, by which the present invention may be non-limited.

The characteristic of the frames is in that the AP is unable to know an STA configured to transmit the frames. Among the aforementioned frames, since the probe request frame, the authentication request frame, and the association request frame are transmitted prior to an association procedure, an AID of an STA, which have transmitted the frame, does not exist and it is difficult for the AP to control an operation of the STA. Moreover, a length of the frame is longer than 100 bytes in general. On the contrary, since the buffer status reporting frame and the PS-poll frame are transmitted after the association procedure, the AID of the STA is used and the AP is able to control an operation of the STA. And, a length of the frame is shorter than scores of bytes in general.

In the aspect of the AP, since it is difficult for the AP to know an STA transmitting a frame, it is necessary for each trigger frame to inform STAs of a value for controlling frame transmission. And, since a characteristic of a frame varies according to a type of the frame, it is preferable to differently configure a transmission opportunity of an STA according to the frame characteristic. A structure of a trigger frame for differently configuring the transmission opportunity is proposed according to one embodiment of the present invention. Having received a trigger frame, an STA transmits a frame in a manner of applying an appropriate value to the frame.

As mentioned in the foregoing description, the probe request frame, the authentication request frame and the association request frame are longer than 100 bytes and it is difficult to anticipate an STA to transmit the frames. On the contrary, the buffer status reporting frame and the PS-poll frame are relatively short and it is able to anticipate an STA to transmit the frames in some degree. Hence, it is preferable to divide a frame type into two types and differently apply CWmin and CWmax according to each frame type to transmit a frame.

Since the probe request frame, the authentication request frame and the association request frame have a long length, a frequency unit is configured by a big unit. Since the frequency unit is big, resource waste may become considerable when a collision occurs. Hence, in order to reduce collision, CWmin and CWmax values can be configured to be relatively big. The CWmin and the CWmax values can be controlled by the AP according to a resource status and a collision occurrence status.

Since the buffer status reporting frame and the PS-poll frame have a short length, a frequency unit is configured by a short unit. Hence, padding necessary for matching the unit with a length of a PPDU transmitted by each of STAs can be reduced. And, since the AP is able to anticipate an STA to transmit the frame in some extent, the AP controls CWmin and CWmax according to an anticipated result. If the number of STAs associated with the AP is small or the number of STAs buffered in a TIM element of a beacon frame is small, it may configure the CWmin and the CWmax to be very small. On the contrary, if the number of STAs associated with the AP is very big and most of the STAs are in an active state or the number of STAs buffered in a TIM element of a beacon frame is very big, it is preferable to configure the CWmin and the CWmax to be big.

As mentioned in the foregoing description, the CWmin and the CWmax of the probe request frame, the authentication request frame, and the association request frame can be configured in a manner of being different from the CWmin and the CWmax of the buffer status reporting frame and the PS-poll frame.

Table 1 in the following shows an example of the aforementioned CWmin, the CWmax, and the frequency unit.

TABLE 1

| | CWmin | CWmax | Resource Size |
|---|---|---|---|
| Frame Type 1 (Probe Request Frame, Authentication Request Frame, Association Request Frame) | 15 | 31 | 2 |
| Frame Type 2 (Buffer Status Report Frame, PS-Poll Frame) | 7 | 15 | 1 |

Figure 39:
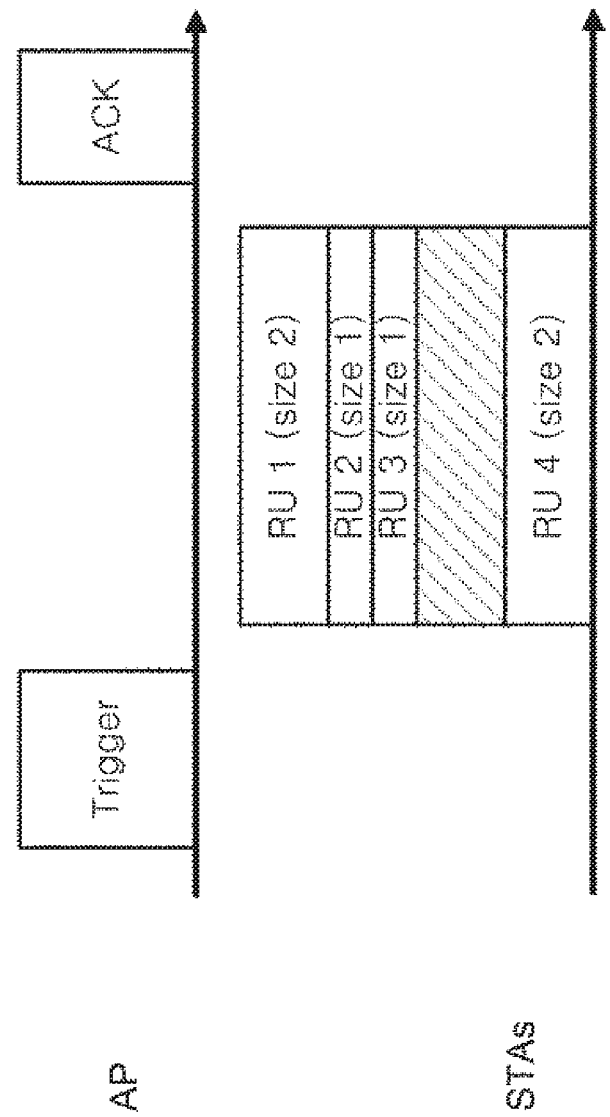
FIG. 39 is a diagram for frequency-unit allocation allocated by a trigger frame according to one embodiment of the present invention.

FIG. 39 is a diagram for frequency-unit allocation allocated by a trigger frame according to one embodiment of the present invention.

Referring to FIG. 39, an AP differently allocates a frequency unit while transmitting a trigger frame. For example, the AP allocates two RUs of which a frequency unit corresponds to 1 and allocates two RUs of which a frequency unit corresponds to 2. Assume that the trigger frame includes information shown in Table 1. An STA intending to transmit a frame type 1 can perform transmission in an RU 1 and an RU 4 only. In this case, a CWmin value and a CWmax value correspond to 15 and 31, respectively. And, an STA intending to transmit a frame type 2 can perform transmission in an RU 2 and an RU 3 only. In this case, a CWmin value and a CWmax value correspond to 7 and 15, respectively.

FIG. 40 is a diagram for a format of multi-user random access information according to one embodiment of the preset invention. For example, FIG. 40 shows a field configuration when a trigger frame includes the information shown in Table 1 as an information element. If an AP configures three or more frame types according to a situation, different information can be additionally added.

Figure 41:
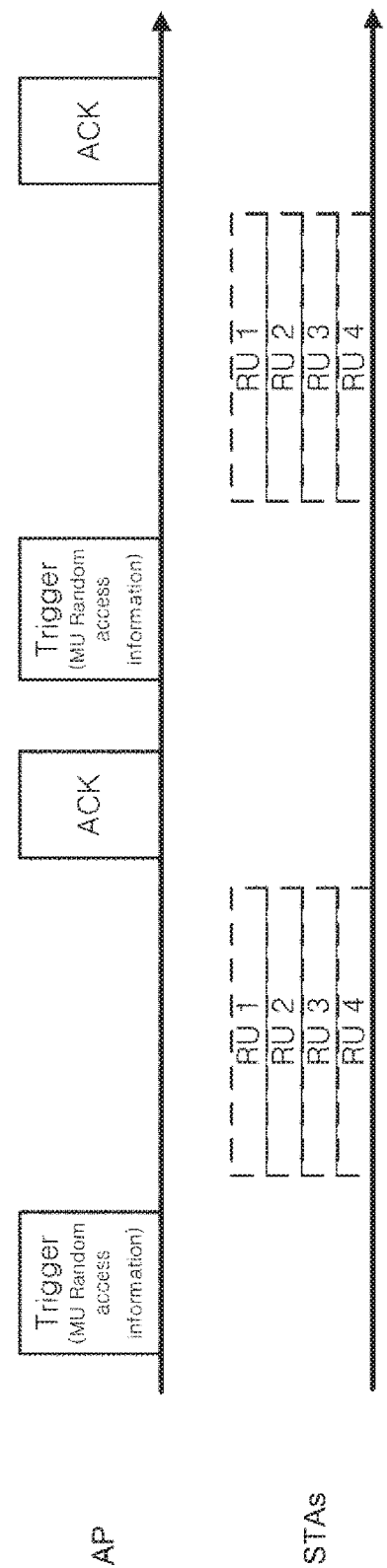
FIG. 41 is a diagram for a multi-user random access method according to one embodiment of the present invention.

FIG. 41 is a diagram for a multi-user random access method according to one embodiment of the present invention.

The aforementioned multi-user random access information can be included in every trigger frame. An STA sets a CW value to CWmin whenever a trigger frame is received. This is because an AP informs the STA of a changed CWmin value according to a collision situation. However, since the STA may fail to receive a trigger frame, a legacy backoff count can be maintained.

Or, the STA may operate according to multi-user random access information of a firstly received trigger frame and the STA may ignore information received from a following trigger frame. The present embodiment is appropriate for a case that the STA has failed to receive a trigger frame.

Figure 42:
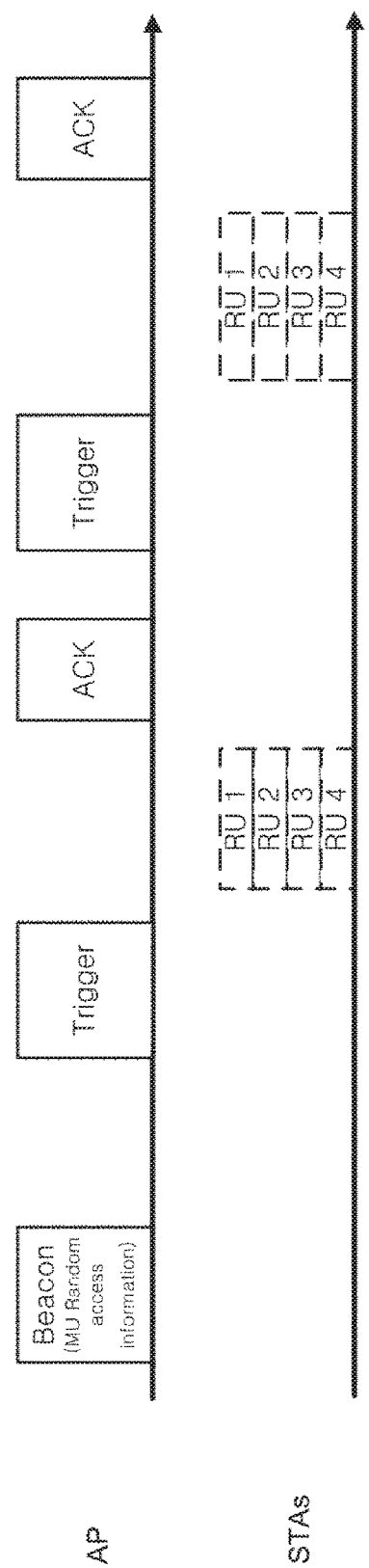
FIG. 42 is a diagram for a multi-user random access method according to a different embodiment of the present invention.

FIG. 42 is a diagram for a multi-user random access method according to a different embodiment of the present invention.

According to an embodiment of FIG. 42, multi-user random access information is transmitted in a beacon frame and the multi-user random access information may not be transmitted in a trigger frame. An STA is able to know such a value as CWmin, CWmax, RU, and the like for multi-user random access via a beacon frame during a beacon interval. If a trigger frame is received, the STA is able to transmit a frame by applying such a value as CWmin, CWmax, RU, and the like.

Information of a trigger frame to be included in a beacon frame can include expected time for transmitting each trigger frame and information of a frequency unit (RU) to be allocated by each trigger frame (e.g., position and total numbers of RUs).

In the aforementioned embodiments, although multi-user random access information is differently configured according to a frame type, by which the present invention may be non-limited. For example, a method of accessing a channel by dividing an access category into 4 types including AC_V0, AC_V1, AC_BE, and AC_BK in EDCA can be borrowed. In particular, it may be able to differently configure multi-user random access according to AC of each frame.

For example, in case of a probe request frame, an authentication request frame, and an association request frame for network aggregation, since it is important to reduce delay, multi-user random access is set to AC_V0 to allocate higher priority. On the contrary, since PS-poll is previously set to AC_BE, multi-user random access also follows AC_BE. In case of a buffer status reporting frame, AC changes according to AC queue to be reported. For example, when a status of AC_VI queue is reported, multi-user random access is performed according to AC_VI.

Table 2 shows multi-user random access information according to each AC. An AP transmits a trigger frame or a beacon frame in a manner of including multi-user random access information in the trigger frame or the beacon frame. Or, an STA receives and stores multi-user random access information to be used in a BSS from an AP in the association step and the STA may perform multi-user random access using the stored value.

TABLE 2

|  | CWmin | CWmax | Resource Size |
|---|---|---|---|
| AC_VO (Probe Request, Authentication Request, Association Request, Buffer Status Report of AC_VO queue) | 3 | 3 | 1/2 |
| AC_VI (Buffer Status Report of AC_VI queue) | 7 | 7 | 1 |
| AC_BE (PS-Poll, Buffer Status Report of AC_BE queue) | 7 | 15 | 1 |
| AC_BK (Buffer Status Report of AC_BK queue) | 15 | 31 | 1 |

In this case, it may use MU TXOP sharing technology of 802.11ac. In particular, when a primary AC transmits a buffer status reporting frame, the primary AC can also transmit buffer status information of a secondary AC. Similar to the MU TXOP sharing technology of 802.11ac, an AC transmitting a buffer status reporting frame via multi-user random access becomes the primary AC. And, similar to the MU TXOP sharing technology of 802.11ac, according to a retransmission method, only the primary AC increases CW and the secondary AC can continuously perform backoff without increasing the CW.

Figure 43:
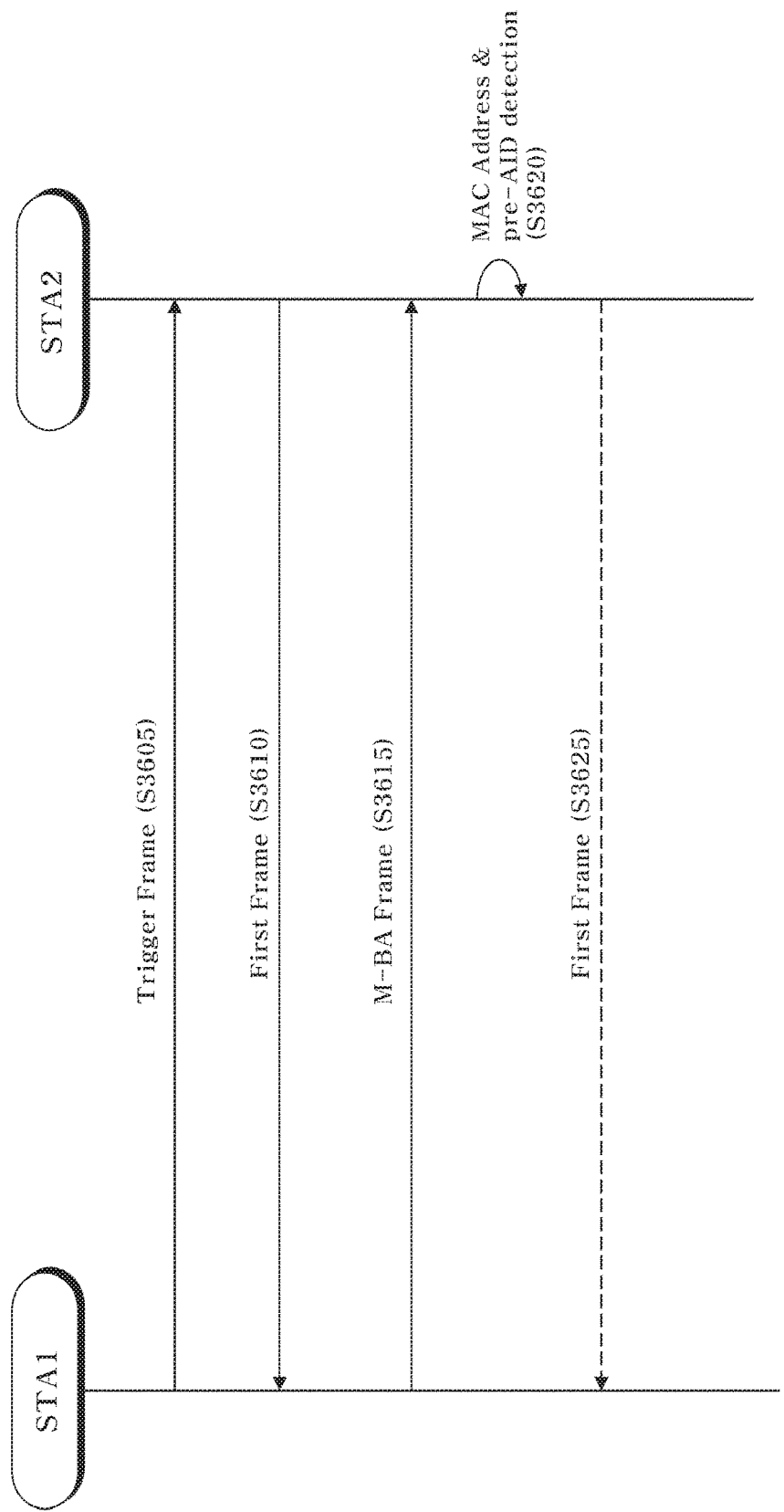
FIG. 43 is a flowchart for a method of transmitting and receiving a signal according to one embodiment of the present invention.

FIG. 43 is a flowchart for a method of transmitting and receiving a signal according to one embodiment of the present invention.

Referring to FIG. 43, a first station transmits a trigger frame to a second station [S3605]. The trigger frame can indicate a plurality of resources for multi-user OFDMA-based random access. And, according to one embodiment, it may be able to allocate a temporary AID according to each of a plurality of the resources.

The second station transmits a first frame to the first station via at least one of the resources indicated by the trigger frame [S3610]. The first frame can be transmitted on a bandwidth narrower than 20 MHz according to MU-OFDMA (multi user-orthogonal frequency division multiple access)-based random access scheme. The first frame may correspond to an association request frame or a probe request frame.

The first station transmits M-BA frame in response to the first frame [S3615]. For example, the first station sets MAC address of the second station different from first information to at least a part of a first field reserved for the first information in the M-BA (multi-STA block ack) frame and configures N-bits of a second field preceding the first field as a temporary AID of the second station to transmit the M-BA frame.

The first field can include at least one of a block ack starting sequence control field and a block ack bitmap field in the M-BA frame.

The N-bits of the second field may correspond to one or more bit(s) among 'B0' to 'B10' of a Per traffic identifier information field or bits of the block ack starting sequence control field.

The temporary AID of the second station may correspond to an ID mapped to at least one or more resources in which the first frame is transmitted among the resources indicated by the trigger frame.

The second station detects MAC address and temporary AID from the M-BA frame [S3620]. The MAC address can be detected when LSB (least significant bit) is activated among reserved bits of the per traffic identifier information field in the M-BA frame or a TID value is configured by a first value.

For example, if MAC address of the second station different from first information is detected from at least a part of the first field reserved for the first information in the M-BA frame, N-bit of the second field appearing before the first field is configured as a temporary AID (association identifier) of the second station.

The second station can be identified by the temporary AID in the association procedure which is performed by MU-OFDMA (multi user-orthogonal frequency division multiple access)-based random access scheme.

Meanwhile, the second station can transmit the first frame again under a specific condition [S3625]. If a TID value is configured by a second value in the per traffic identifier information field of the M-BA frame, the second station can retransmit the first frame at the timing indicated by the second value.

Or, if the N-bit of the first field is configured by a value corresponding to at least one or more resources in which the first frame is transmitted and MAC address of the second station is not detected from the first field, the second station can retransmit the first frame.

Figure 44:
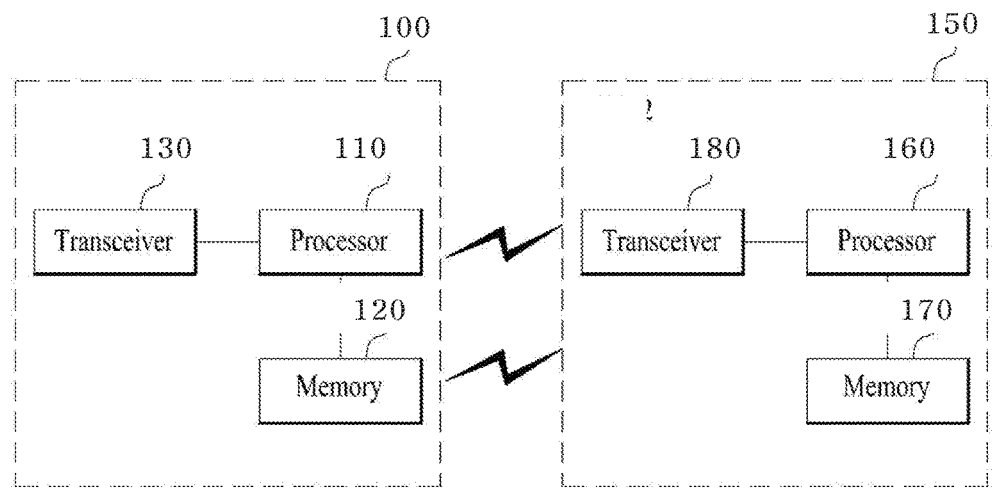
FIG. 44 is a block diagram for an exemplary configuration of an AP (or a base station) and a station (or a user equipment)

FIG. 44 is a block diagram for an exemplary configuration of an AP (or a base station) and a station (or a user equipment).

An AP 100 can include a processor 110, a memory 120, and a transceiver 130. A station 150 can include a processor 160, a memory 170, and a transceiver 180.

The transceiver 130/180 can transmit/receive a radio signal and can implement a physical layer according to IEEE 802 system for example. The processor 110/160 is connected with the transceiver 130/180 and can implement a physical layer and/or a MAC layer according to IEEE 802 system. The processor 110/160 can be configured to perform an operation according to a combination of one or more embodiments of the various embodiments of the present invention. And, a module for implementing operations of the AP and the station according to the various embodiments of the present invention can be stored in a memory 120/170 and can be implemented by the processor 110/160. The memory 120/170 can be connected with the processor 110/160 via a well-known medium in a manner of being installed in the inside of the processor 110/160 or installed in the outside of the processor 110/160.

Explanation on the aforementioned AP 100 and the station 150 can be respectively applied to a base station and a user equipment in a different wireless communication system (e.g., LTE/LTE-A system).

For a concrete configuration of the AP and the station, items mentioned earlier in various embodiments of the present invention can be independently applied or two or more embodiments can be applied at the same time. For clarity, explanation on contents overlapped with the aforementioned contents is omitted.

Figure 45:
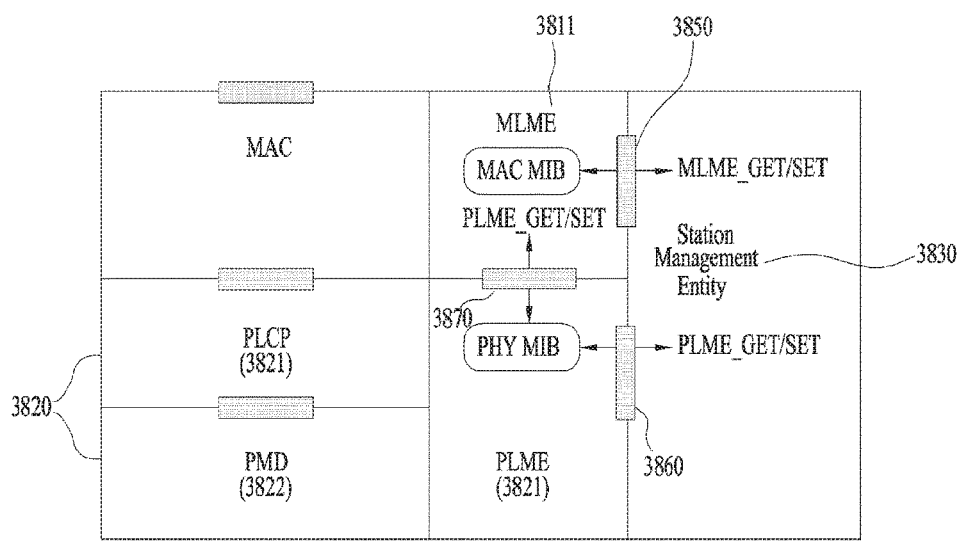
FIG. 45 is a diagram for an exemplary structure of an AP or a station.

FIG. 45 is a diagram for an exemplary structure of an AP or a station.

A processor of an AP or a station may have a plurality of layers. FIG. 45 mainly describes a MAC sublayer 3810 and a physical layer 3820 on a data link layer (DLL). As shown in FIG. 38, The PHY 3820 may include a PLCP (Physical Layer Convergence Procedure) entity 3821, a PMD (Physical Medium Dependent) entity 3822 and the like. The MAC sublayer 3810 and PHY 3820 respectively include management entities, which are respectively called an MLME (MAC sublayer Management Entity) 3811. These entities 3811/3821 provide a layer management service interface through which a layer management function is operated.

To provide accurate MAC operation, an SME (Station Management Entity) 3830 is present in each STA. The SME 3830 is a layer-independent entity which is present in a separate management plane or can be regarded as off to the side. While functions of the SME 3830 are not described in detail in the specification, the SME 3830 can be considered to execute functions of collecting layer-dependent statues from various layer management entities (LMEs), setting layer-specific parameters to similar values and the like. The SME 3830 can execute such functions on behalf of normal system management entities and implement a standard management protocol, in general.

The aforementioned entities shown in FIG. 45 interact in various manners. In FIG. 45, for example, entities can interact by exchanging GET/SET primitives there between. XX-GET.request primitive is used to request the value of a given MIB attribute (management information based attribute information). XX-GET.confirm primitive is used to return an appropriate MIB attribute information value in the case of a status of "success" and to return an error indication in a status field otherwise. XX-SET.request primitive is used to request an indicated MIB attributed to be set to a given value. When the MIB attribute refers to a specific operation, this represents request for execution of the operation. XX-SET.confirm primitive is used to confirm that an indicated MIB attribute has been set to a requested value in the case of a status of "success" and to return an error condition in the status field otherwise. When the MIB attribute refers to a specific operation, this confirms that the corresponding operation has been performed.

As shown in FIG. 45, the MLME 3811 and the SME 3830 can exchange various MLME_GET/SET primitives through an MLME_SAP (Service Access Point) 3850 there between. Furthermore, various PLME_GET/SET primitives can be exchanged between the PLME 3821 and the SME 3830 through a PLME_SAP 3860 and between the MLME 3811 and the PLME 3870 through an MLME-PLME_SAP 3870.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein. Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Both an apparatus invention and a method invention are explained in the present specification. If necessary, explanation on the both inventions can be complementally applied.

INDUSTRIAL APPLICABILITY

As mentioned in the foregoing description, the embodiments of the present invention can be applied not only to IEEE 802.11 system but also to various wireless communication systems.

What is claimed is:
1. A method of transmitting a signal by a station (STA) in a wireless local area network (LAN) system, the method comprising:
   transmitting, to an access point (AP), a first frame via at least one of resources indicated by a trigger frame; and
   receiving, from the AP, a multi-STA block acknowledgement (M-BA) frame in response to the first frame,
   wherein the M-BA frame includes a BA information field, the BA information field including one or more information sets,
   wherein each of the one or more information sets includes an association identifier (AID) subfield, a traffic iden- tifier (TID) subfield and either one of a BA bitmap subfield or a medium access control (MAC) address subfield, and
wherein when the STA is a unassociated STA to which an AID is not assigned, a special value that cannot be used as an unique AID for an associated STA is configured to the AID subfield of a first information set intended to the unassociated STA and the first information set is configured to include the MAC address subfield without the BA bitmap subfield.

2. The method of claim 1, wherein each of the one or more information sets further includes at least one of a block acknowledgement starting sequence control (BASSC) subfield and an acknowledgement (ACK) type subfield.

3. The method of claim 2, wherein the STA determines whether a corresponding information set includes the MAC address subfield or the BA bitmap subfield based on at least one of the AID subfield, the TID subfield, the BASSC subfield and the ACK type subfield.

4. The method of claim 2, wherein the TID subfield is set to all 1s, when a corresponding information set includes the MAC address subfield.

5. The method of claim 4, wherein the ACK type subfield is set to zero when the corresponding information set includes the MAC address subfield.

6. The method of claim 1, wherein the first frame is transmitted according to an orthogonal frequency division multiple access (OFDMA)-based random access scheme.

7. The method of claim 1, further comprising:
receiving the trigger frame containing allocation information of the resources,
wherein the resources includes a random access resource in which random access of the associated STA is not allowed.

8. The method of claim 1, wherein the STA considers the M-BA frame as a positive acknowledgement for the first frame transmission, when the MAC address subfield of the first information set is set to a MAC address of the STA.

9. The method of claim 8, further comprising:
retransmitting the first frame, when the MAC address of the STA is not detected from the first information set.

10. The method of claim 1,
wherein the first frame comprises an association request frame or a probe request frame, and
wherein in the first information set, the AID subfield corresponds to an initial 11 bits, the TID subfield corresponds to 4 bits, and the MAC address subfield corresponds to 48 bits.

11. A method of receiving a signal by an access point (AP) in a wireless LAN system, the method comprising:
receiving, from a station (STA), a first frame via at least one of resources indicated by a trigger frame; and
transmitting, to the STA, a multi-STA block acknowledgement (M-BA) frame in response to the first frame,
wherein the M-BA frame includes a BA information field, the BA information field including one or more information sets,
wherein each of the one or more information sets includes an association identifier (AID) subfield, a traffic identifier (TID) subfield and either one of a BA bitmap subfield or a medium access control (MAC) address subfield, and
wherein when the STA is a unassociated STA to which an AID is not assigned, a special value that cannot be used as an unique AID for an associated STA is configured to the AID subfield of a first information set intended to the unassociated STA and the first information set is configured to include the MAC address subfield without the BA bitmap subfield.

12. The method of claim 11, wherein each of the one or more information sets further includes at least one of a block acknowledgement starting sequence control (BASSC) subfield and an acknowledgement (ACK) type subfield.

13. The method of claim 12, wherein the TID subfield is set to all 1s, when a corresponding information set includes the MAC address subfield.

14. The method of claim 13, wherein the ACK type subfield is set to zero when the corresponding information set includes the MAC address subfield.

15. The method of claim 11, wherein the first frame is received according to an orthogonal frequency division multiple access (OFDMA)-based random access scheme.

16. The method of claim 11, further comprising:
transmitting the trigger frame containing allocation information of the resources,
wherein the resources includes a random access resource in which random access of the associated STA is not allowed.

17. The method of claim 11, wherein the processor sets the MAC address subfield of the first information set as a MAC address of the STA, in a case of a positive acknowledgement for the first frame reception.

18. The method of claim 11,
wherein the first frame comprises an association request frame or a probe request frame, and
wherein in the first information set, the AID subfield corresponds to an initial 11 bits, the TID subfield corresponds to 4 bits, and the MAC address subfield corresponds to 48 bits.

19. A station (STA) comprising:
a transmitter;
a receiver; and
a processor to control the transmitter to transmit, to an access point (AP), a first frame via at least one of resources indicated by a trigger frame, to control the receiver to receive, from the AP, a multi-STA block acknowledgement (M-BA) frame in response to the first frame;
wherein the M-BA frame includes a BA information field, the BA information field including one or more information sets,
wherein each of the one or more information sets includes an association identifier (AID) subfield, a traffic identifier (TID) subfield and either one of a BA bitmap subfield or a medium access control (MAC) address subfield, and
wherein when the STA is a unassociated STA to which an AID is not assigned, a special value that cannot be used as an unique AID for an associated STA is configured to the AID subfield of a first information set intended to the unassociated STA and the first information set is configured to include the MAC address subfield without the BA bitmap subfield.

20. An access point (AP) comprising:
a receiver;
a transmitter; and
a processor to control the receiver to receive, from a station (STA), a first frame via at least one of resources indicated by a trigger frame, and to control the transmitter to transmit, to the STA, a multi-STA block acknowledgement (M-BA) frame in response to the first frame, wherein the M-BA frame includes a BA information field, the BA information field including one or more information sets, wherein each of the one or more information sets includes an association identifier (AID) subfield, a traffic identifier (TID) subfield and either one of a BA bitmap subfield or a medium access control (MAC) address subfield, and wherein when the STA is a unassociated STA to which an AID is not assigned, a special value that cannot be used as an unique AID for an associated STA is configured to the AID subfield of a first information set intended to the unassociated STA and the first information set is configured to include the MAC address subfield without the BA bitmap subfield.

* * * * *